United States Patent
Machidori et al.

(10) Patent No.: US 8,189,143 B2
(45) Date of Patent: May 29, 2012

(54) DISPLAY DEVICE

(75) Inventors: Wataru Machidori, Hyogo (JP);
Satoshi Kitao, Kyoto (JP)

(73) Assignee: Panasonic Corporation, Osaka (JP)

( * ) Notice: Subject to any disclaimer, the term of this patent is extended or adjusted under 35 U.S.C. 154(b) by 528 days.

(21) Appl. No.: 12/296,722

(22) PCT Filed: Apr. 2, 2007

(86) PCT No.: PCT/JP2007/057395
§ 371 (c)(1),
(2), (4) Date: Oct. 10, 2008

(87) PCT Pub. No.: WO2007/122983
PCT Pub. Date: Nov. 1, 2007

(65) Prior Publication Data
US 2009/0279025 A1    Nov. 12, 2009

(30) Foreign Application Priority Data
Apr. 17, 2006   (JP) .................................. 2006-113596

(51) Int. Cl.
G02F 1/1333 (2006.01)
G02B 27/22 (2006.01)
H04N 13/04 (2006.01)

(52) U.S. Cl. ........................................................ 349/110

(58) Field of Classification Search ................... 349/110; 359/462, 464; 348/51
See application file for complete search history.

(56) References Cited

U.S. PATENT DOCUMENTS

| | | |
|---|---|---|
| 4,807,965 A | 2/1989 | Garakani |
| 5,315,377 A | 5/1994 | Isono et al. |
| 5,900,972 A | 5/1999 | Chikazawa |
| 6,392,690 B1 * | 5/2002 | Fujii et al. ........................ 348/59 |
| 2006/0007053 A1 * | 1/2006 | Lee et al. ........................ 345/1.3 |
| 2009/0058845 A1 | 3/2009 | Fukuda et al. |

FOREIGN PATENT DOCUMENTS

| | | |
|---|---|---|
| EP | 0540137 | 5/1993 |
| EP | 1804233 A1 | 7/2007 |
| GB | 2405516 | 3/2005 |
| GB | 2405517 | 3/2005 |
| GB | 2405518 | 3/2005 |
| GB | 2405544 | 3/2005 |
| JP | 3-119889 A | 5/1991 |
| JP | 9-236776 A | 9/1997 |

(Continued)

OTHER PUBLICATIONS

English language Abstract of JP 11-072745 A.
English language Abstract of JP 2006-184860 A.
English language Abstract of JP 9-236776 A.
English language Abstract of JP 2004-054193 A.
English language Abstract of JP 2005-078093 A.

(Continued)

*Primary Examiner* — Mark Robinson
*Assistant Examiner* — Jerry Blevins
(74) *Attorney, Agent, or Firm* — Greenblum & Bernstein, P.L.C.

(57) ABSTRACT

A liquid crystal display panel is divided into a plurality of regions and a plurality of regions extending in respective striped shapes. The plurality of regions and the plurality of regions are arranged so as to alternately align. A plurality of sub-pixels are assigned to a first group and a second group, three sub-pixels of the first group constitute a pixel, and three sub-pixels of the second group constitute a pixel. Each pair of regions adjacent to each other constitutes each set, and parallax barriers are formed in a portion on a black matrix between adjacent sets and portions on the black matrix on outer sides of the regions positioned at ends, respectively.

12 Claims, 16 Drawing Sheets

| FOREIGN PATENT DOCUMENTS | | |
|---|---|---|
| JP | 11-072745 A | 3/1999 |
| JP | 2004-054193 | 2/2004 |
| JP | 2004-054193 A | 2/2004 |
| JP | 2005-078080 A | 3/2005 |
| JP | 2005-078093 A | 3/2005 |
| JP | 2006-184860 A | 7/2006 |

OTHER PUBLICATIONS

English language Abstract of JP 3-119889 A.
English language Abstract of JP 2005-078080 A.
Japan Official Decision to Grant a Patent, mailed Mar. 6, 2012, for corresponding Japanese Patent Application.

* cited by examiner

F I G. 15
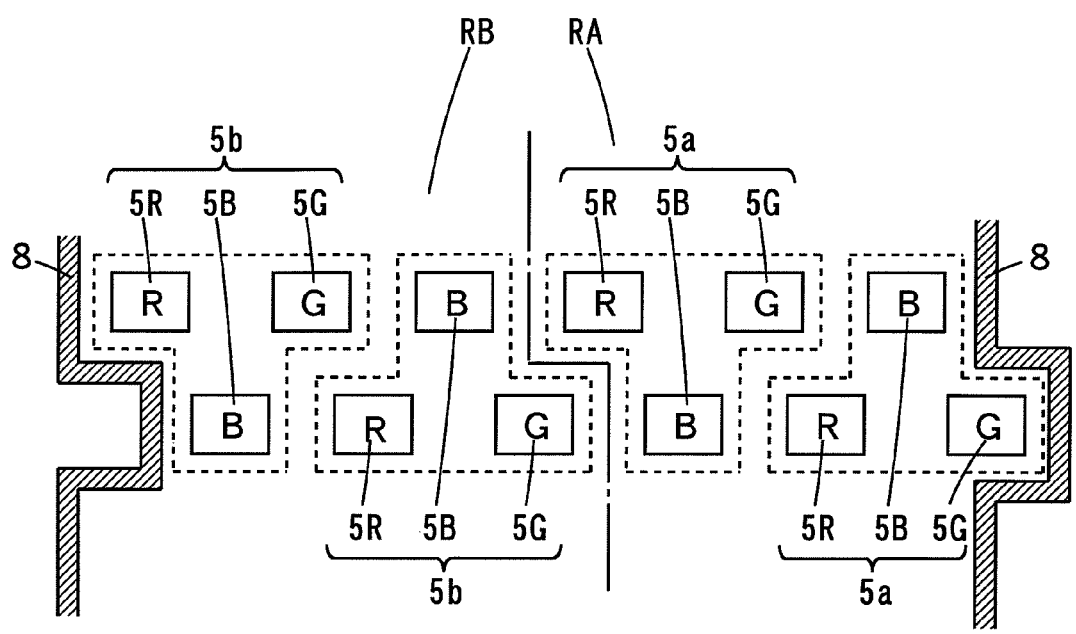

DISPLAY DEVICE

TECHNICAL FIELD

The present invention relates to a display device capable of presenting different kinds of video when seen from different angles.

BACKGROUND ART

A display device capable of presenting different kinds of video on one screen when seen from different angles has been proposed. Such a display device is called a dual view display device. For example, an in-vehicle dual view display device presents video for car navigation or presents no video to a driver's seat side while presenting another video such as a movie and a television program to a passenger's seat side, thereby ensuring safe driving and providing various kinds of video for fellow passengers.

Here, Patent Document 1 describes a light control element outputting light in a first polarization state to a first angular range and outputting light in a second polarization state to a second angular range and a dual view display including the same.

FIG. 16 is a schematic view showing the configuration of the conventional dual view display described in Patent Document 1. In FIG. 16, a vertical direction is referred to as an x-direction, a horizontal direction as a y-direction and a front-back direction as a z-direction.

As shown in FIG. 16, a first optical control element 503, a second optical control element 504, a switchable half-wavelength plate 505 and a linear polarizer 506 are arranged between a back light 501 and a transmissive image display panel 502. The switchable half-wavelength plate 505 is arranged so as to have an optical axis of 45° with respect to a transmission axis of the linear polarizer 506.

As indicated by the solid arrows L, the first optical control element 503 transmits polarized light in the vertical direction (hereinafter referred to as x-polarized light) to a narrow angular range with about +30°, for example, as a center with respect to an axis of the display in the z-direction, and does not absorb polarized light in the horizontal direction (hereinafter referred to as y-polarized light). As indicated by the solid arrows R, the second optical control element 504 transmits the y-polarized light to a narrow angular range with about −30°, for example, as a center with respect to the axis of the display in the z-direction, and does not absorb the x-polarized light. The switchable half-wavelength plate 505 does not affect the polarized light passing therethrough when turned off, and rotates the polarized light by 90° when turned on. The linear polarizer 506 with its transmission axis arranged in the y-direction absorbs the x-polarized light and transmits the y-polarized light.

In one display mode of the display, the switchable half-wavelength plate 505 is turned off and does not affect the polarized light passing therethrough. The first optical control element 503 does not affect the y-polarized light. Thus, the y-polarized light from the back light 501 passes through the first optical control element 503 to be led in the direction of the arrows R by the second optical control element 504. The y-polarized light passes through the linear polarizer 506 to be output toward a viewer 520. Meanwhile, the x-polarized light that is led in the direction of the arrow L by the first optical control element 503 is absorbed by the linear polarizer 506. Accordingly, the viewer 520 can see video displayed on the display panel 502 and a viewer 510 sees the dark display panel 502.

In another display mode of the display, the switchable half-wavelength plate 505 is turned on and rotates the polarized light by 90°. The second optical control element 504 does not affect the x-polarized light. The x-polarized light from the back light 501 is led in the direction of the arrows L by the first optical control element 503 to pass through the second optical control element 504. The x-polarized light is converted into the y-polarized light by the switchable half-wavelength plate 505. Thus, the y-polarized light passes through the linear polarizer 506 to be output toward the viewer 510. Meanwhile, the y-polarized light led in the direction of the arrows R by the second optical control element 504 is converted into the x-polarized light by the switchable half-wavelength plate 505 to be absorbed by the linear polarizer 506. Accordingly, the viewer 510 can see video displayed on the display panel 502 and the viewer 520 sees the dark display panel 502.

When video is presented for each of the viewer 510 and the viewer 520, the switchable half-wavelength plate 505 is switched between an on state and an off state at high speed. Video for the viewer 520 is displayed during a period where the switchable half-wavelength plate 505 is turned off and video for the viewer 510 is displayed during a period where the switchable half-wavelength plate 505 is turned on. In this manner, video displayed on the display panel 502 is switched in synchronization with a switching operation of the switchable half-wavelength plate 505.

[Patent Document 1] JP 2005-78093 A

DISCLOSURE OF THE INVENTION

Problems to be Solved by the Invention

As described above, the dual view display is realized by using the first and second optical control elements in Patent Document 1.

When the configuration of the display of Patent Document 1 is applied to a liquid crystal display device, however, the first optical control element, the second optical control element and the switchable half-wavelength plate are required. This causes the configuration of the liquid crystal display device to be complicated, thus preventing reduction in thickness.

In particular, the first optical control element is manufactured by arranging a number of polarizers that do not transmit the polarized light in the vertical direction, and the second optical control element is manufactured by arranging a number of polarizers that do not transmit the polarized light in the horizontal direction. This causes manufacturing processes to be complicated, inhibiting cost reduction.

In addition, since the switching operation of the switchable half-wavelength plate and switching of video are required to be carried out in synchronization with each other at high speed, the configuration of a peripheral circuit becomes complicated.

In addition, when the configuration of the display of Patent Document 1 is applied to a plasma display device using a plasma display panel (PDP), not only the first optical control element, the second optical control element and the switchable half-wavelength plate but also the linear polarizing plate that is not necessary in the plasma display device are required. This inhibits reduction in thickness and cost of the plasma display device while decreasing luminance by half because of the linear polarizing plate. Accordingly, application of the configuration of the display of Patent document 1 to the plasma display device lacks practicality. In addition, the configuration of the peripheral circuit becomes complicated, similarly to the liquid crystal display device.

An object of the present invention is to provide a display device, which is practical and can be reduced in cost, capable of presenting different kinds of video when seen from different angles without causing the configuration of the display panel and the configuration of the peripheral circuit to be complicated.

Means for Solving the Problems (1) According to the present invention, a display device includes a display panel including a plurality of units of display arranged in the form of a matrix and including a black matrix in a region between the units of display, and a barrier formed on the black matrix of the display panel, wherein the plurality of units of display are divided into a first group and a second group, and the barrier is provided so as to block light traveling obliquely forward to one side of the display panel from the units of display of the first group and block light traveling obliquely forward to another side of the display panel from the units of display of the second group.

In the display device, the barrier is formed on the black matrix of the display panel. In addition, the plurality of units of display of the display panel are divided into the first group and the second group. The light traveling obliquely forward to the one side of the display panel from the units of display of the first group is blocked by the barrier, and the light traveling obliquely forward to the another side of the display panel from the units of display of the second group is blocked.

Accordingly, a person positioned in the obliquely forward direction to the another side of the display panel can see the units of display of the first group of the display panel and cannot see the units of display of the second group of the display panel. On the other hand, a person positioned in the obliquely forward direction to the one side of the display panel can see the units of display of the second group of the display panel and cannot see the units of display of the first group of the display panel. Thus, different kinds of video are displayed in the units of display of the first group and the units of display of the second group, respectively, so that the different kinds of video can be presented in the common display panel for the person positioned in the obliquely forward direction to the one side and the person positioned in the obliquely forward direction to the another side, respectively.

In this case, it is not necessary to add a complicated structural element in the display panel. Thus, the configuration of the display panel is not complicated, thus not preventing reduction in thickness.

In addition, since the barrier is formed on the black matrix, the barrier does not become an obstacle when the display panel is seen from the front. This prevents a lower luminance of the display panel, resulting in high practicality. Moreover, the configuration provided with the barrier allows the display panel to be prevented from being increased in size for realizing dual view display.

Furthermore, since the barrier can be easily provided on the display panel, manufacturing processes are not complicated, thus enabling reduction in cost.

In addition, a switching operation for displaying different kinds of video in the units of display of the first group and the units of display of the second group, respectively, is not required in the display panel. This does not cause the configuration of a peripheral circuit to be complicated.

(2) The display panel may be divided into a plurality of first regions and a plurality of second regions in respective striped shapes extending in a first direction, the plurality of first regions and the plurality of second regions may be alternately arranged in a second direction that crosses the first direction, the units of display of the first group may be arranged in the plurality of first regions, the units of display of the second group may be arranged in the plurality of second regions, and pairs of the first and second regions that are adjacent to each other may constitute respective sets, and the barrier may be formed in a striped shape in portions on the black matrix between the adjacent sets.

In this case, the light traveling obliquely forward to the one side of the display panel from the units of display of the first regions in the striped shape is blocked by the barrier, and the light traveling obliquely forward to the another side of the display panel from the units of display of the second regions in the striped shape is blocked. Thus, the person positioned in the obliquely forward direction to the one side of the display panel can see the units of display of alternate regions of the plurality of regions in the striped shapes, and the person positioned in the obliquely forward direction to the another side of the display panel can see the units of display of the another alternate regions of the plurality of regions in the striped shapes.

(3) The plurality of units of display may include a plurality of first sub-pixels that generate light of a first color, a plurality of second sub-pixels that generate light of a second color and a plurality of third sub-pixels that generate light of a third color, and one of the first sub-pixels, one of the second sub-pixels and one of the third sub-pixels may constitute one pixel, a plurality of pixels may be divided into the first group and the second group, the first, second and third sub-pixels that constitute each of the pixels of the first group may be arranged in the same first region, and the first, second and third sub-pixels that constitute each of the pixels of the second group may be arranged in the same second region.

In this case, the first, second and third sub-pixels that constitute each of the pixels are proximate to one another, thus realizing high color precision.

(4) The plurality of pixels of the first group included in each of the plurality of first regions may be arranged in a column, and the plurality of pixels of the second group included in each of the plurality of second regions may be arranged in a column.

In this case, the widths of the striped first and second regions in the second direction can be reduced. Thus, the height of the barrier can be lowered, allowing the width of the striped pattern formed in the video by the barrier to be reduced. This decreases deterioration in picture quality.

(5) The plurality of units of display may include a plurality of first sub-pixels that generate light of a first color, a plurality of second sub-pixels that generate light of a second color and a plurality of third sub-pixels that generate light of a third color, and one of the first sub-pixels, one of the second sub-pixels and one of the third sub-pixels may constitute one pixel, and a plurality of pixels may be divided into the first group and the second group, the first sub-pixel, the second sub-pixel and the third sub-pixel that constitute each of the pixels of the first group may be arranged in the different first regions, respectively, and the first sub-pixel, the second sub-pixel and the third sub-pixel that constitute each of the pixels of the second group may be arranged in the different second regions, respectively.

In this case, the first and second regions can be reduced in size. This allows the height of the barrier to be further lowered. Accordingly, the width of the striped pattern formed in the video by the barrier can be further reduced. As a result, deterioration in picture quality can be further decreased.

(6) The plurality of first sub-pixels, the plurality of second sub-pixels or the plurality of third sub-pixels of the first group included in each of the plurality of first regions may be arranged in a column, and the plurality of first sub-pixels, the plurality of second sub-pixels or the plurality of third sub-pixels of the second group included in each of the plurality of second regions may be arranged in a column.

In this case, the widths of the first and second regions in the second direction can be sufficiently reduced. This allows the height of the barrier to be sufficiently lowered. Accordingly, the width of the striped pattern formed in the video by the barrier can be sufficiently reduced. As a result, deterioration in picture quality can be sufficiently decreased.

(7) The plurality of units of display may be composed of a plurality of filter portions that transmit light of respective specific colors, and the display panel may include a backlight that generates light, a first polarizing plate, a liquid crystal cell, a filter including the plurality of filter portions and the black matrix, and a second polarizing plate in this order.

In this case, the liquid crystal display device capable of presenting different kinds of video when seen from different angles without causing the configuration of the display panel and the configuration of the peripheral circuit to be complicated is realized.

(8) The plurality of units of display may be composed of a plurality of light emitting cells that generate light of respective specific colors, and the display panel may include a first substrate, a light emitting cell group including the plurality of light emitting cells and the black matrix, and a second substrate that is translucent in this order.

In this case, a self-light emitting display device capable of presenting different kinds of video when seen from different angles without causing the configuration of the display panel and the configuration of the peripheral circuit to be complicated is realized.

(9) The display device may further include a controller that receives a first video signal corresponding to the first group and a second video signal corresponding to the second group, causes first video to be displayed by the units of display of the first group of the display panel based on the first video signal, and causes second video to be displayed by the units of display of the second group of the display panel based on the second video signal.

In this case, the first video is displayed by the units of display of the first group of the display panel based on the first video signal, and the second video is displayed by the units of display of the second group of the display panel based on the second video signal. Accordingly, different kinds of video when seen from different angles can be presented without performing a switching operation in the display panel. This does not cause the configuration of the peripheral circuit including the controller to be complicated.

(10) The controller may receive a third video signal for a front view of the display panel and cause video to be displayed by the units of display of the first and second groups of the display panel based on the third video signal.

In this case, video is displayed by the units of display of the first and second groups of the display panel based on the third video signal. Thus, video can be seen from the front of the display panel.

As described above, presentation of video toward the obliquely forward directions to the one side and the another side of the display panel and presentation of video toward the front of the display panel can be easily switched by selecting the first and second video signals or the third video signal.

In addition, the barrier does not become an obstacle when the video of the display panel is seen from the front, thus preventing a lower luminance.

EFFECTS OF THE INVENTION

According to the present invention, different kinds of video are displayed in units of display of a first group and units of display of a second group, respectively, so that different kinds of video can be presented in a common display panel toward a person positioned in an obliquely forward direction to one side and a person positioned in an obliquely forward direction to the another side, respectively.

In this case, it is not necessary to add a complicated structural element in the display panel. This does not cause the configuration of the display panel to be complicated, thus not preventing reduction in thickness.

Moreover, since a barrier is formed on a black matrix, the barrier does not become an obstacle when the display panel is seen from the front. This prevents a lower luminance of the display panel, resulting in high practicality. In addition, the configuration provided with the barrier allows the display panel to be prevented from being increased in size for realizing the dual view display.

Furthermore, since the barrier can be easily provided on the display panel, manufacturing processes are not complicated, thus enabling reduction in cost.

In addition, a switching operation is not required in the display panel for displaying different kinds of video in the units of display of the first group and the units of display of the second group, respectively. This does not cause the configuration of the peripheral circuit to be complicated.

BRIEF DESCRIPTION OF THE DRAWINGS

FIG. 15 is a schematic view showing another example of arrangement of pixels and sub-pixels.

BEST MODE FOR CARRYING OUT THE INVENTION (1) First Embodiment

In the present embodiment, description is made of a case where the present invention is applied to a liquid crystal display device.

(1-1) Configuration of Liquid Crystal Display Panel

Figure 1:
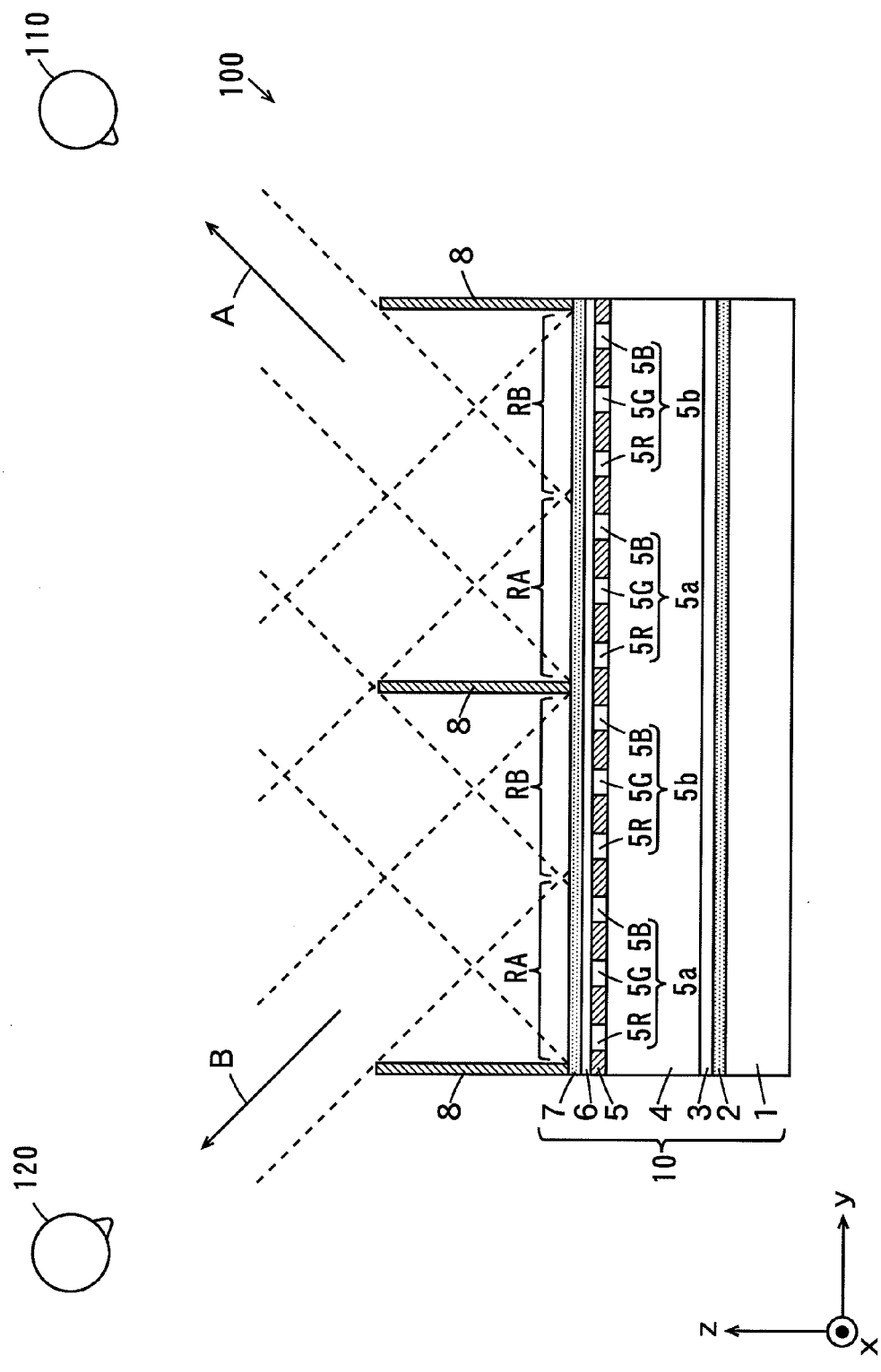
FIG. 1 is a schematic sectional view of part of a liquid crystal display device according to a first embodiment of the present invention.
Figure 2:
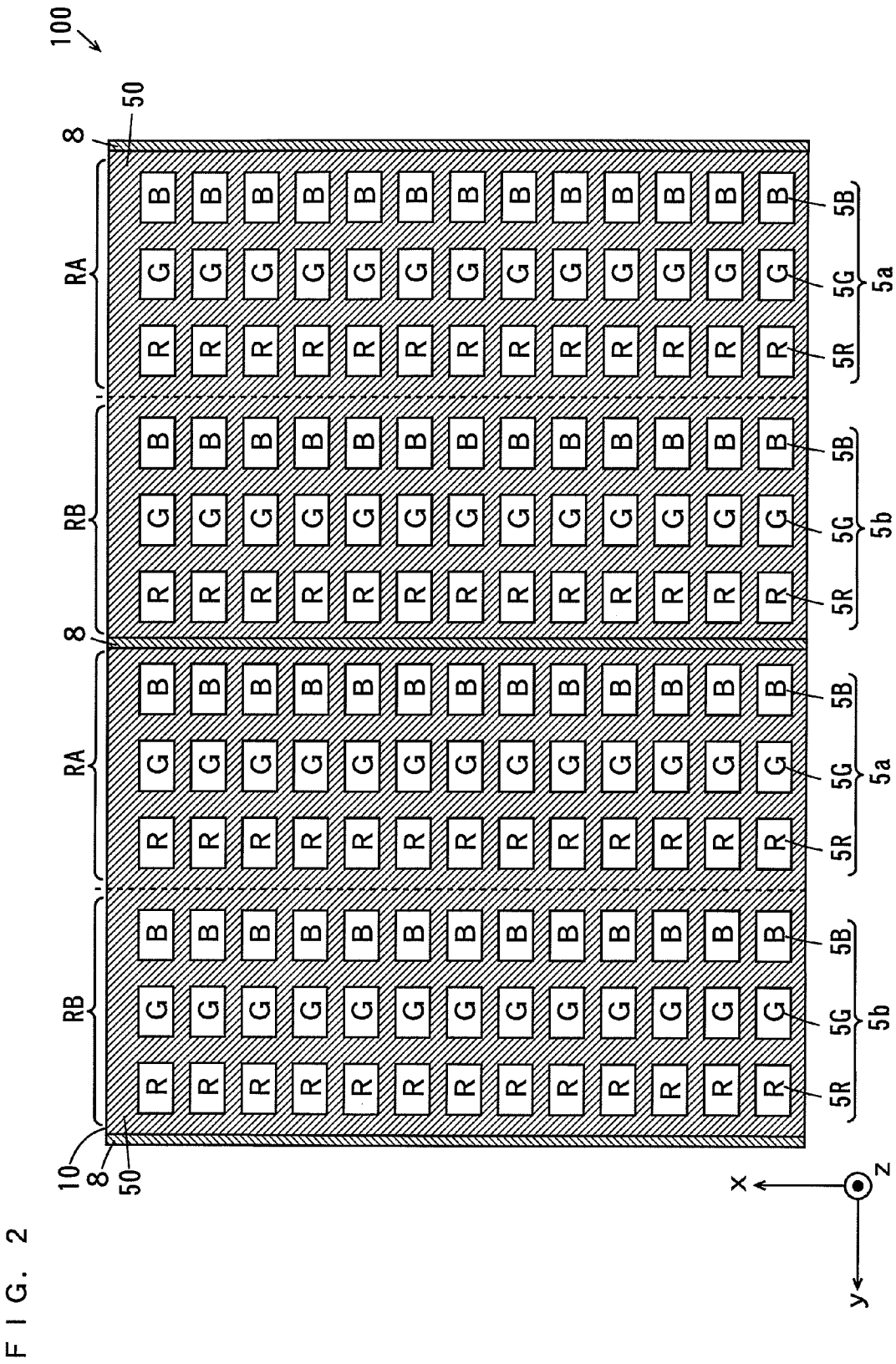
FIG. 2 is a schematic plan view of part of the liquid crystal display device of FIG. 1.
Figure 3:
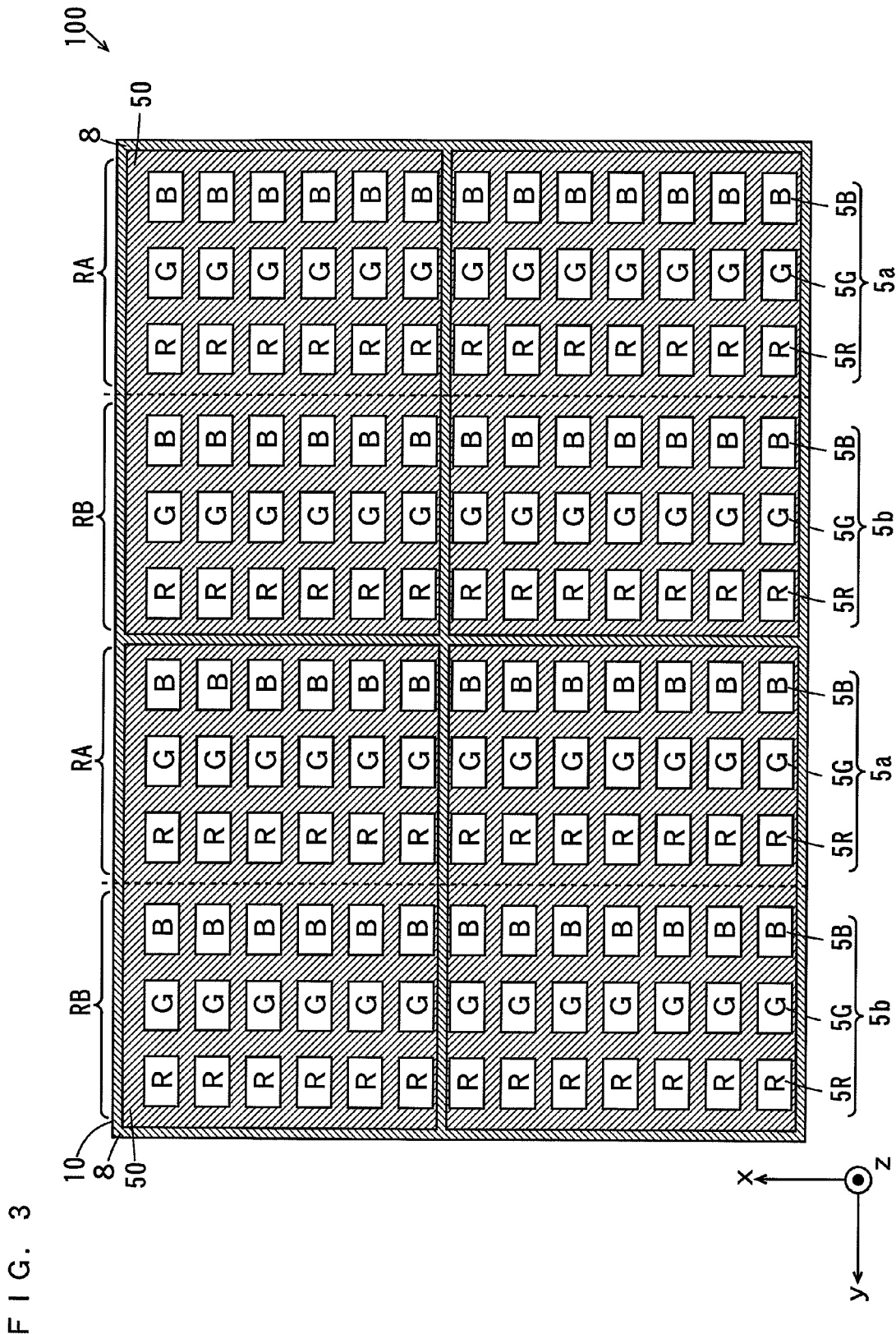
FIG. 3 is a schematic plan view of part of the liquid crystal display device of FIG. 1.

FIG. 1 is a schematic sectional view of part of a liquid crystal display device according to a first embodiment of the present invention. FIGS. 2 and 3 are schematic plan views each showing part of the liquid crystal display device of FIG. 1. FIG. 2 shows an example of a method of arranging parallax barriers 8, described later, and FIG. 3 shows another example of the method of arranging the parallax barriers 8, described later.

In FIGS. 1 to 3, three directions that are perpendicular to one another are defined as an x-direction, a y-direction and a z-direction indicated by the arrows. The x-direction is a vertical direction, the y-direction is a horizontal direction that is parallel to a surface of the liquid crystal display device 100, and the z-direction is a front-back direction of the liquid crystal display device 100. This also applies to the views described later.

In the following description, a right side seen from a screen of the liquid crystal display device 100 is simply referred to as right, and a left side seen from the screen of the liquid crystal display device 100 is simply referred to as left.

The liquid crystal display device 100 of FIG. 1 includes a liquid crystal display panel 10. The liquid crystal display panel 10 has a configuration in which a backlight 1, a polarizing plate 2, a back surface glass 3, a liquid crystal cell 4, a color filter 5, a top surface glass 6 and a polarizing plate 7 are laminated in this order. A front face of the liquid crystal display panel 10 is the screen.

The color filter 5 includes a plurality of sub-pixels 5R, 5G, 5B arranged in the form of a matrix in the x-direction and the y-direction. The sub-pixel 5R is composed of a filter that transmits red light, the sub-pixel 5G is composed of a filter that transmits green light, and the sub-pixel 5B is composed of a filter that transmits blue light.

As shown in FIGS. 2 and 3, the sub-pixels 5R of the same kind, the sub-pixels 5G of the same kind and the sub-pixels 5B of the same kind are arranged in respective columns that are parallel to the x-direction. Moreover, the three kinds of sub-pixels 5R, 5G, 5B are sequentially arranged in each row that is parallel to the y-direction.

A black matrix 50 is provided in a region surrounding each of the sub-pixels 5R, 5G, 5B of the color filter 5.

The liquid crystal display panel 10 is divided into a plurality of regions RA and a plurality of regions RB that extend in respective striped shapes along the x-direction. The plurality of regions RA and the plurality of regions RB are arranged so as to alternately align in the y-direction.

The plurality of sub-pixels 5R, 5G, 5B are assigned to a first group and a second group. The three sub-pixels 5R, 5G, 5B, aligning along the y-direction, of the first group constitute a pixel 5a. The three sub-pixels 5R, 5G, 5B, aligning along the y-direction, of the second group constitute a pixel 5b. In this case, the sub-pixels 5R, 5G, 5B, which constitute each of the pixels 5a, 5b, are proximate to one another, thus realizing high color precision.

In the region RA, the plurality of pixels 5a of the first group align along the x-direction. Thus, the plurality of sub-pixels 5R, 5G, 5B align in respective three columns along the x-direction in the region RA. Similarly, the plurality of pixels 5b of the second group align along the x-direction in the region RB. Thus, the plurality of sub-pixels 5R, 5G, 5B align in respective three columns along the x-direction in the region RB.

Each pair of regions RA, RB being adjacent to each other constitutes each set. The parallax barriers 8 are formed in a portion on the black matrix 50 between the adjacent sets and in portions on the black matrix 50 on outer sides of the regions RA, RB positioned at ends, respectively.

In the example of FIG. 2, the parallax barriers 8 extending in the x-direction are formed in a portion on the black matrix 50 between the region RA of one set of the two adjacent sets and the region RB of the other set and in portions on the black matrix 50 on outer sides of the regions RA, RB positioned at both ends, respectively.

In the example of FIG. 3, similarly to the example of FIG. 2, the parallax barriers 8 extending in the x-direction are formed in a portion on the black matrix 50 between the region RA of one set of the two adjacent sets and the region RB of the other set and in portions on the black matrix 50 on outer sides of the regions RA, RB positioned at both ends, respectively. Furthermore, the parallax barriers 8 extending in the y-direction are formed in a portion on the black matrix 50 between the pixels 5a arranged in the x-direction and between the pixels 5b arranged in the x-direction and portions on the black matrix 50 on outer sides of the pixels 5a, 5b positioned at an upper end and a lower end in FIG. 3. In this example, the parallax barriers 8 extending in the y-direction reinforces the parallax barriers 8, thereby assisting maintenance of the parallax barriers 8 in a lattice shape.

Resin, metal and so on can be used for a material of the parallax barriers 8. The color of the parallax barriers 8 is preferably black, which is the same color as the black matrix 50, and more preferably matte black that prevents reflection of emitted light.

As shown in FIG. 1, the parallax barriers 8 block light traveling obliquely forward to the left from the regions RA and block light traveling obliquely forward to the right from the regions RB. Accordingly, a viewer 110 positioned in an obliquely forward direction to the right of the liquid crystal display device 100 can see the pixels 5a of the regions RA of the liquid crystal display panel 10 as indicated by the arrow A, and cannot see the pixels 5b of the regions RB because of the parallax barriers 8. On the other hand, a viewer 120 positioned in an obliquely forward direction to the left of the liquid crystal display device 100 can see the pixels 5b of the regions RB of the liquid crystal display panel 10 as indicated by the arrow B, and cannot see the pixels 5a of the regions RA because of the parallax barriers 8. Accordingly, the viewer 110 can see video displayed by the pixels 5a of the regions RA of the liquid crystal display panel 10, and the viewer 120 can see video displayed by the pixels 5b of the regions RB of the liquid crystal display panel 10.

The angle from which the viewer 110 can see only the pixels 5a of the regions RA and the angle from which the viewer 120 can see only the pixels 5b of the regions RB vary depending on the height of the parallax barriers 8.

For example, when the height of the parallax barriers 8 is substantially equal to the width of the region RA or the region RB in the y-direction, the viewer 110 can see only the pixels 5a of the regions RA from the direction of 45° with respect to the front surface of the liquid crystal display panel 10, and the viewer 120 can see only the pixels 5b of the regions RB from the direction of 45° with respect to the front surface of the liquid crystal display panel 10.

Note that the angles of such a dual view can be arbitrarily adjusted depending on uses by adjusting the height of the parallax barriers 8 in design or manufacture.

(1-2) Configuration of Video Signal Processing Circuit and Display Operation

Figure 4:
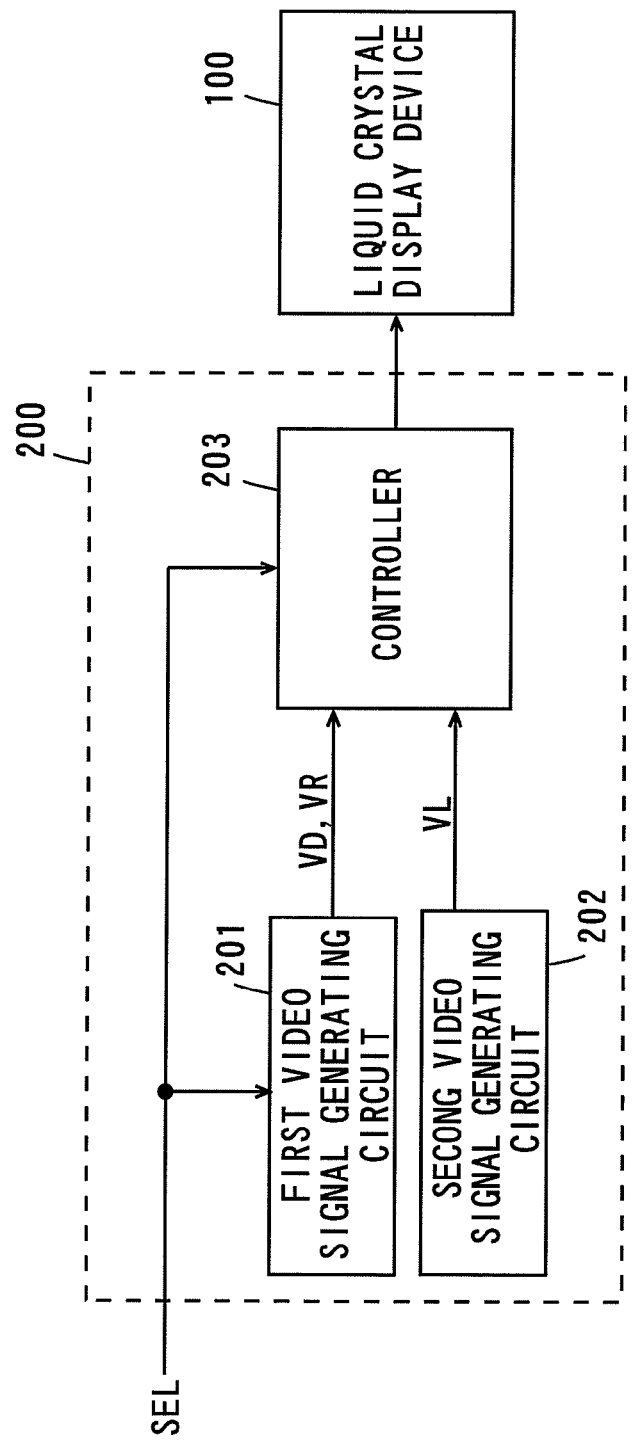
FIG. 4 is a block diagram showing an example of the configuration of a video signal processing circuit used in the liquid crystal display device according to the present embodiment.
Figure 5:
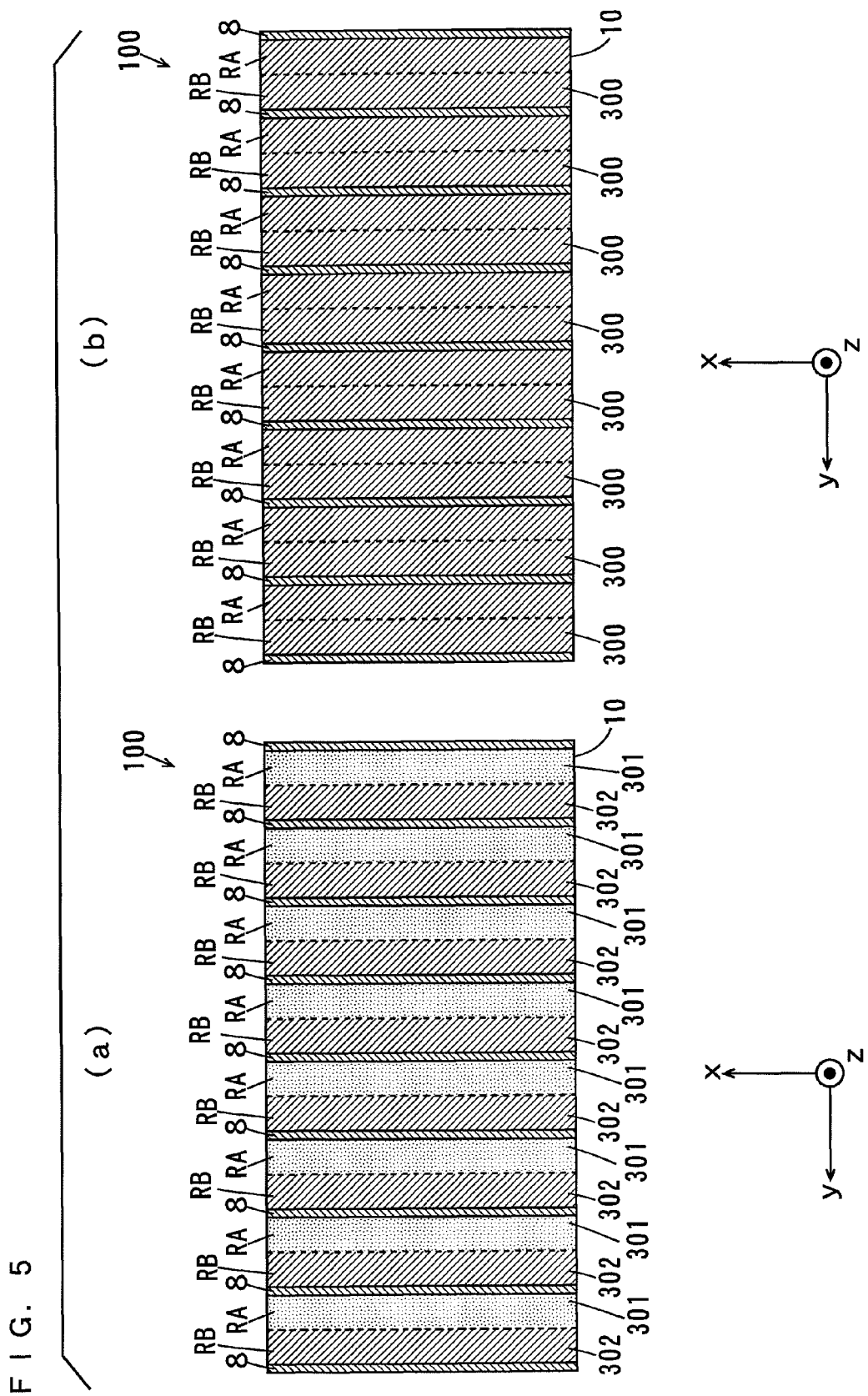
FIG. 5 is a diagram for explaining video displayed on a screen of the liquid crystal display device.

FIG. 4 is a block diagram showing an example of the configuration of a video signal processing circuit used in the liquid crystal display device 100 according to the present embodiment. FIG. 5 is a diagram for explaining video displayed on the screen of the liquid crystal display device 100. In FIG. 5, (a) shows a state in which video toward the left and video toward the right are displayed on the screen of the liquid crystal display device 100, and (b) shows a state in which video toward the front is displayed on the screen of the liquid crystal display device 100.

In FIG. 4, the video signal processing circuit 200 is connected to the liquid crystal display device 100. The video signal processing circuit 200 includes a first video signal generating circuit 201, a second video signal generating circuit 202 and a controller 203.

The first video signal generating circuit 201 selectively generates a front-use video signal VD for displaying video for a viewer positioned in front of the liquid crystal display device 100 and a right-use video signal VR for displaying video for a viewer positioned in an obliquely forward direction to the right. The second video signal generating circuit 202 generates a left-use video signal VL for displaying video for a viewer positioned in an obliquely forward direction to the left.

The front-use video signal VD causes video to be displayed in the whole area of the liquid crystal display panel 10. The right-use video signal VR causes video to be displayed in the regions RA of the liquid crystal display panel 10, and the left-use video signal VL causes video to be displayed in the regions RB of the liquid crystal display panel 10.

A selecting signal SEL is supplied to the controller 203 by a user operation using an operation unit such as a remote controller.

For example, when the selecting signal SEL is "1", the right-use video signal VR is generated by the first video signal generating circuit 201. The controller 203 alternately selects the right-use video signal VR generated by the first video signal generating circuit 201 and the left-use video signal VL generated by the second video signal generating circuit 202 to display right video 301 in the regions RA of the liquid crystal display panel 10 as indicated by the dot pattern in FIG. 5 (a) based on the right-use video signal VR and display left video 302 in the regions RB of the liquid crystal display panel 10 as indicated by the oblique line pattern in FIG. 5 (a) based on the left-use video signal VL.

This allows the viewer 110 of FIG. 1 to see the right video 301 displayed in the regions RA of the liquid crystal display panel 10. Light directed toward the viewer 110 from the regions RB is intercepted by the parallax barriers 8, so that the viewer 110 cannot see the left video 302 displayed in the regions RB.

Meanwhile, the viewer 120 of FIG. 1 can see the left video 302 displayed in the regions RB of the liquid crystal display panel 10. Light directed toward the viewer 120 from the regions RA is intercepted by the parallax barriers 8, so that the viewer 120 cannot see the right video 301 displayed in the regions RA.

Accordingly, the viewer 110 and the viewer 120 can see different kinds of video, respectively, in the common liquid crystal display device 100. For example, when the liquid crystal display device 100 is used in a car navigation system, video such as a television broadcast and a movie is displayed in the regions RA of the liquid crystal display panel 10, and video for car navigation is displayed in the regions RB of the liquid crystal display panel 10. In this case, the viewer 110 can see the video such as the television broadcast and the movie, and the viewer 120 can see the video for car navigation.

Moreover, in a barber shop, a hair salon and so on, when the liquid crystal display device 100 is arranged at a front wall between adjacent chairs, a customer sitting at a left-hand chair and a customer sitting at a right-hand chair can see different kinds of video, respectively.

In addition, when the selecting signal SEL is "0", for example, the front-use video signal VD is generated by the first video signal generating circuit 201. The controller 203 causes the front video 300 to be displayed in the whole area of the liquid crystal display panel 10 as indicated by the oblique line pattern in FIG. 5 (b) based on the front-use video signal VD generated by the first video signal generating circuit 201.

(1-3) Effects

In the liquid crystal display device 100 according to the present embodiment, the parallax barriers 8 formed on the black matrix 50 of the color filter 5 allows the viewer 110 positioned in the obliquely forward direction to the right and the viewer 120 positioned in the obliquely forward direction to the left to see different kinds of video, respectively, in the common liquid crystal display device 100.

In this case, it is not necessary to add structural elements such as an optical control element and a switchable half-wavelength plate between the backlight 1 and the color filter 5. This does not cause the configuration of the liquid crystal display panel 10 to be complicated, thus not preventing reduction in thickness.

In addition, since the parallax barriers 8 are formed in the portions on the black matrix 50 surrounding each of the sub-pixels 5R, 5G, 5B, the parallax barriers 8 do not become an obstacle when the liquid crystal display panel 10 is seen from the front. This prevents a lower luminance of the liquid crystal display panel 10, resulting in high practicality. In addition, the liquid crystal display panel 10 is not increased in size for providing the parallax barriers 8.

Furthermore, the parallax barriers 8 can be easily manufactured at low cost using resin, metal and so on and can be easily formed on the black matrix 50 of the color filter 5, thus preventing complicated manufacturing processes and enabling reduction in cost.

In addition, since the right video 301 and the left video 302 can be displayed on the liquid crystal display panel 10 as the controller 203 alternately selects the right-use video signal VR and the left-use video signal VL, a switching operation is not necessary in the liquid crystal display panel 10. This does not cause the configuration of the video signal processing circuit 200 to be complicated.

(2) Second Embodiment

In the present embodiment, description is made of a case where the present invention is applied to a liquid crystal display device.

(2-1) Configuration of Liquid Crystal Display Device

Figure 6:
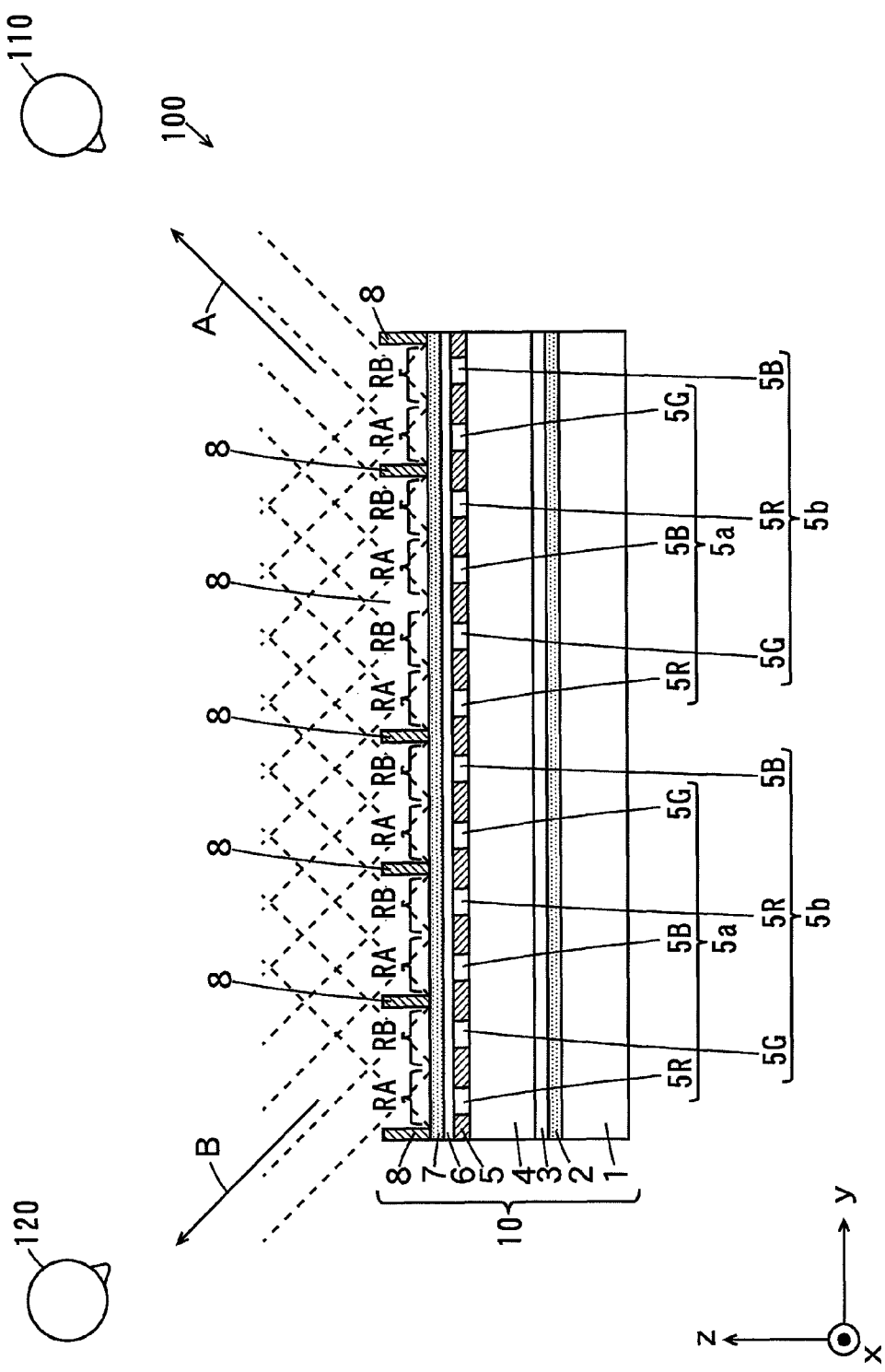
FIG. 6 is a schematic sectional view of part of a liquid crystal display device according to a second embodiment of the present invention.
Figure 7:
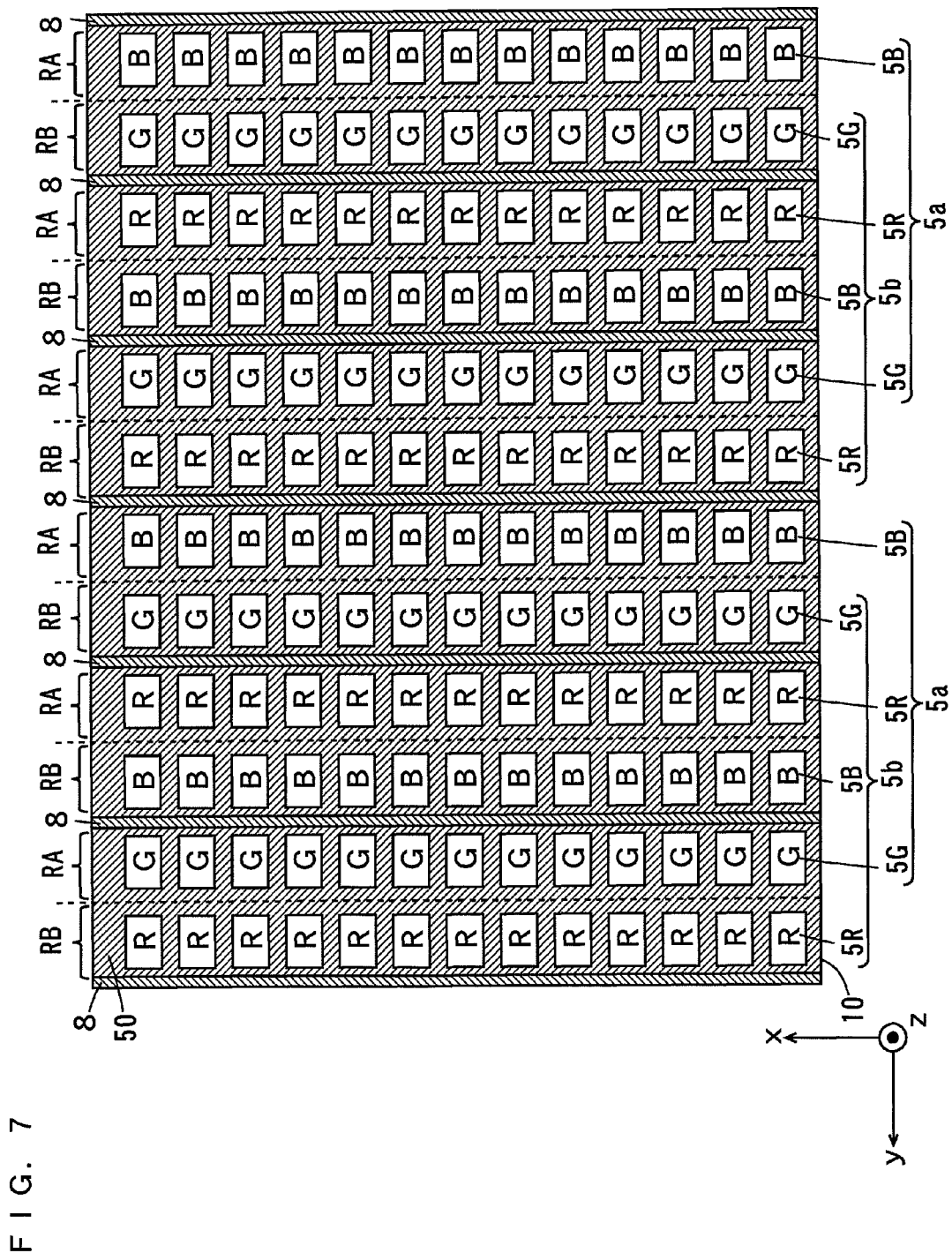
FIG. 7 is a schematic plan view of part of the liquid crystal display device of FIG. 6.
Figure 8:
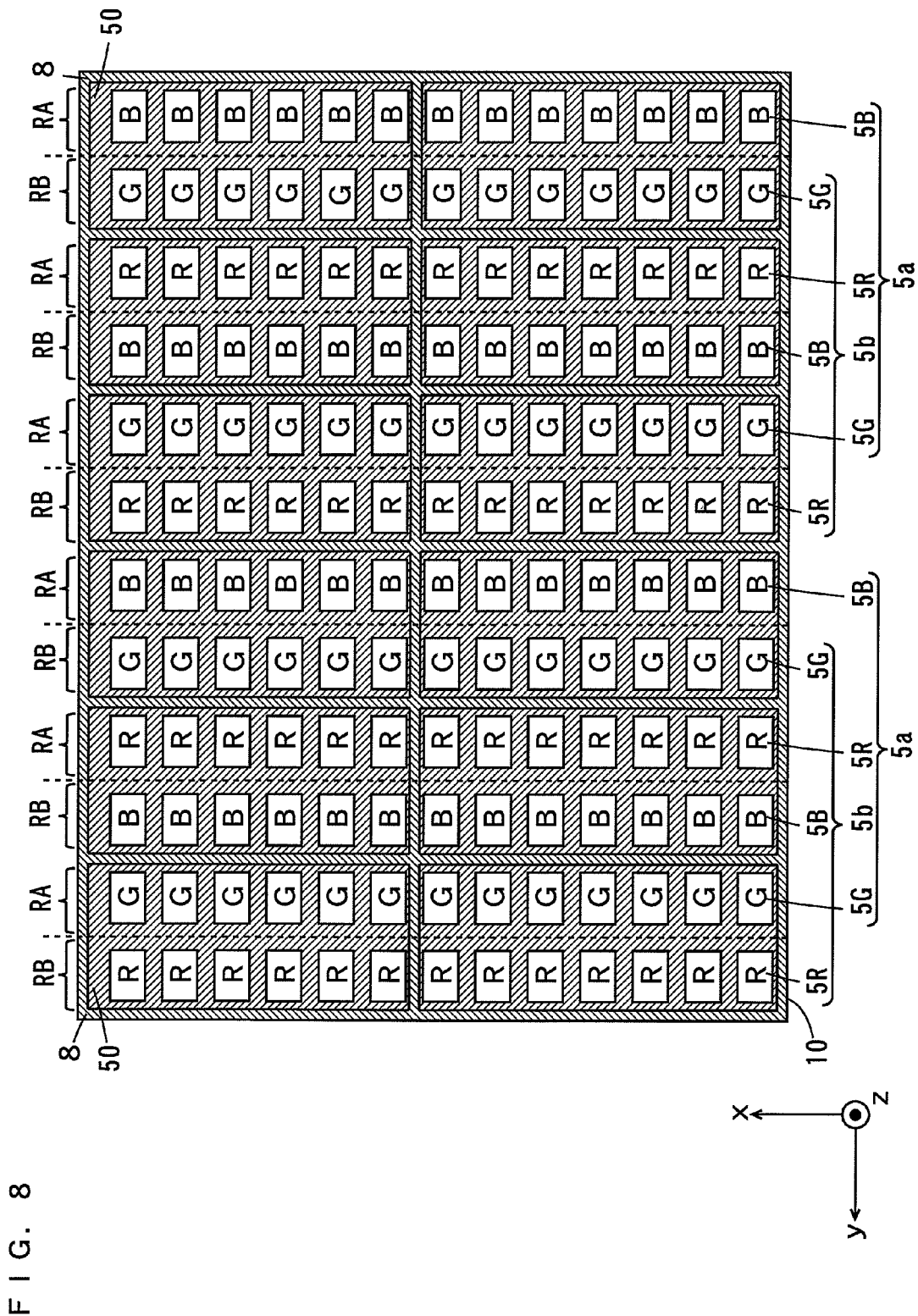
FIG. 8 is a schematic plan view of part of the liquid crystal display device of FIG. 6.

FIG. 6 is a schematic sectional view of part of the liquid crystal display device according to the second embodiment of the present invention. FIGS. 7 and 8 are schematic plan views each showing part of the liquid crystal display device of FIG. 6. FIG. 7 shows one example of the arranging method of the parallax barriers 8, described later, and FIG. 8 shows another example of the arranging method of the parallax barriers 8, described later.

The liquid crystal display device 100 of FIGS. 6 to 8 is different from the liquid crystal display device 100 of FIGS. 1 to 3 in the following points.

In the present embodiment, the sub-pixels 5R, the sub-pixels 5B and the sub-pixels 5G on alternate columns are assigned to the first group, and the sub-pixels 5G, the sub-pixels 5R and the sub-pixels 5B on the other alternate columns are assigned to the second group. Alternate sub-pixels 5R, 5B, 5G, in the y-direction, of the first group constitute the pixel 5a. The other alternate sub-pixels 5G, 5R, 5B, in the y-direction, of the second group constitute the pixel 5b.

The liquid crystal display panel 10 is divided into the plurality of regions RA and the plurality of regions RB that extend in respective striped shapes along the x-direction. The plurality of regions RA and the plurality of regions RB are arranged so as to alternately align in the y-direction.

The sub-pixels 5R, 5B, 5G of the first group align in respective columns in the different regions RA along the x-direction. The sub-pixels 5G, 5R, 5B of the second group align in respective columns in the different regions RB along the x-direction.

Each pair of regions RA, RB being adjacent to each other constitutes each set. The parallax barriers 8 are formed in portions on the black matrix 50 between the adjacent sets and portions on the black matrix 50 on outer sides of the regions RA, RB positioned at ends, respectively.

In the example of FIG. 7, the parallax barriers 8 extending in the x-direction are formed in portions on the black matrix 50 between the region RA of one set of two adjacent sets and the region RB of the other set and portions on the black matrix 50 on outer sides of the regions RA, RB positioned at the both ends, respectively.

In the example of FIG. 8, similarly to the example of FIG. 7, the parallax barriers 8 extending in the x-direction are formed in portions on the black matrix 50 between the region RA of one set of two adjacent sets and the region RB of the other set and portions on the black matrix 50 on outer sides of the regions RA, RB positioned at the both ends, respectively. Furthermore, the parallax barriers 8 extending in the y-direction are formed in a portion on the black matrix 50 between the pixels 5a arranged in the x-direction and between the pixels 5b arranged in the x-direction and portions on the black matrix 50 on outer sides of the pixels 5a, 5b positioned at an upper end and a lower end in FIG. 8. In this example, the liquid crystal display panel 10 is reinforced by the parallax barriers 8 extending in the y-direction.

As shown in FIG. 6, the parallax barriers 8 block the light traveling obliquely forward to the left from the regions RA and block the light traveling obliquely forward to the right from the regions RB. Accordingly, the viewer 110 positioned in the obliquely forward direction to the right of the liquid crystal display device 100 can see the pixels 5a of the regions RA of the liquid crystal display panel 10 as indicated by the arrow A, and cannot see the pixels 5b of the regions RB because of the Parallax barriers 8. On the other hand, the viewer 120 positioned in the obliquely forward direction to the left of the liquid crystal display device 100 can see the pixels 5b of the regions RB of the liquid crystal display panel 10 as indicated by the arrow B, and cannot see the pixels 5a of the regions RA because of the parallax barriers 8. Accordingly, the viewer 110 can see video displayed by the pixels 5a of the regions RA of the liquid crystal display panel 10, and the viewer 120 can see video displayed by the pixels 5b of the regions RB of the liquid crystal display panel 10.

Note that the configuration of the video signal processing circuit used in the liquid crystal display device 100 according to the present embodiment is the same as the configuration shown in FIG. 4.

(2-2) Effects

In the liquid crystal display device 100 according to the present embodiment, the following effects can be obtained in addition to the effects that are the same as those in the liquid crystal display device 100 according to the first embodiment.

In the liquid crystal display device according to the present embodiment, since each of the regions RA and RB includes the sub-pixels in one column, the width in the y-direction of each of the regions RA and the regions RB is sufficiently reduced. This allows the height of the parallax barriers 8 to be sufficiently reduced. Accordingly, the width of a striped pattern (regions of no video) in video that is seen by the viewer 110 positioned in the obliquely forward direction to the right of the liquid crystal display panel 10 and the viewer 120 positioned in the obliquely forward direction to the left can be sufficiently reduced. This sufficiently decreases deterioration in picture quality.

(3) Third Embodiment

In the present embodiment, description is made of a case where the present invention is applied to a plasma display device as an example of a self-light emitting display device.

(3-1) Configuration of Plasma Display Panel

Figure 9:
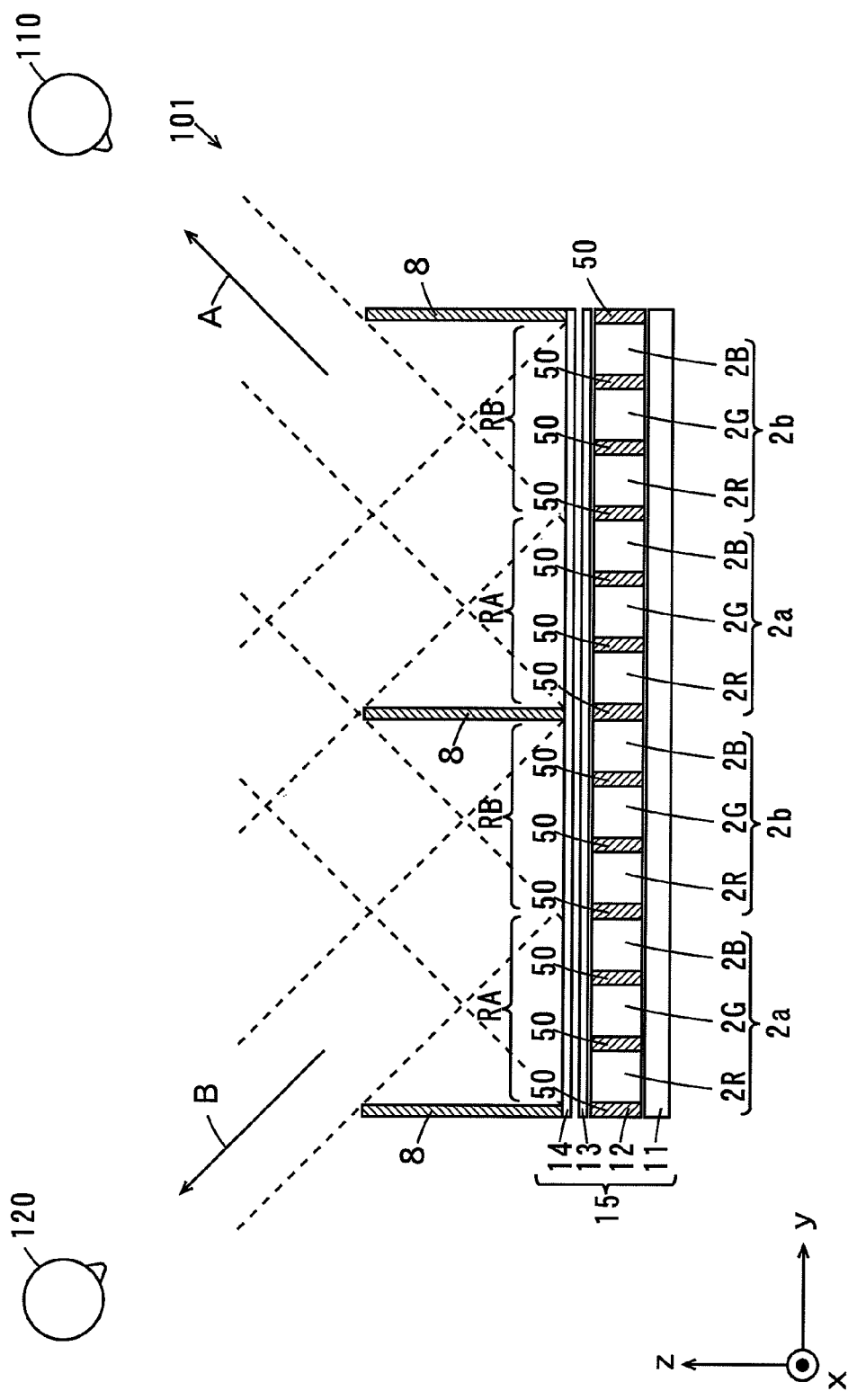
FIG. 9 is a schematic sectional view of part of a plasma display device according to a third embodiment of the present invention.
Figure 10:
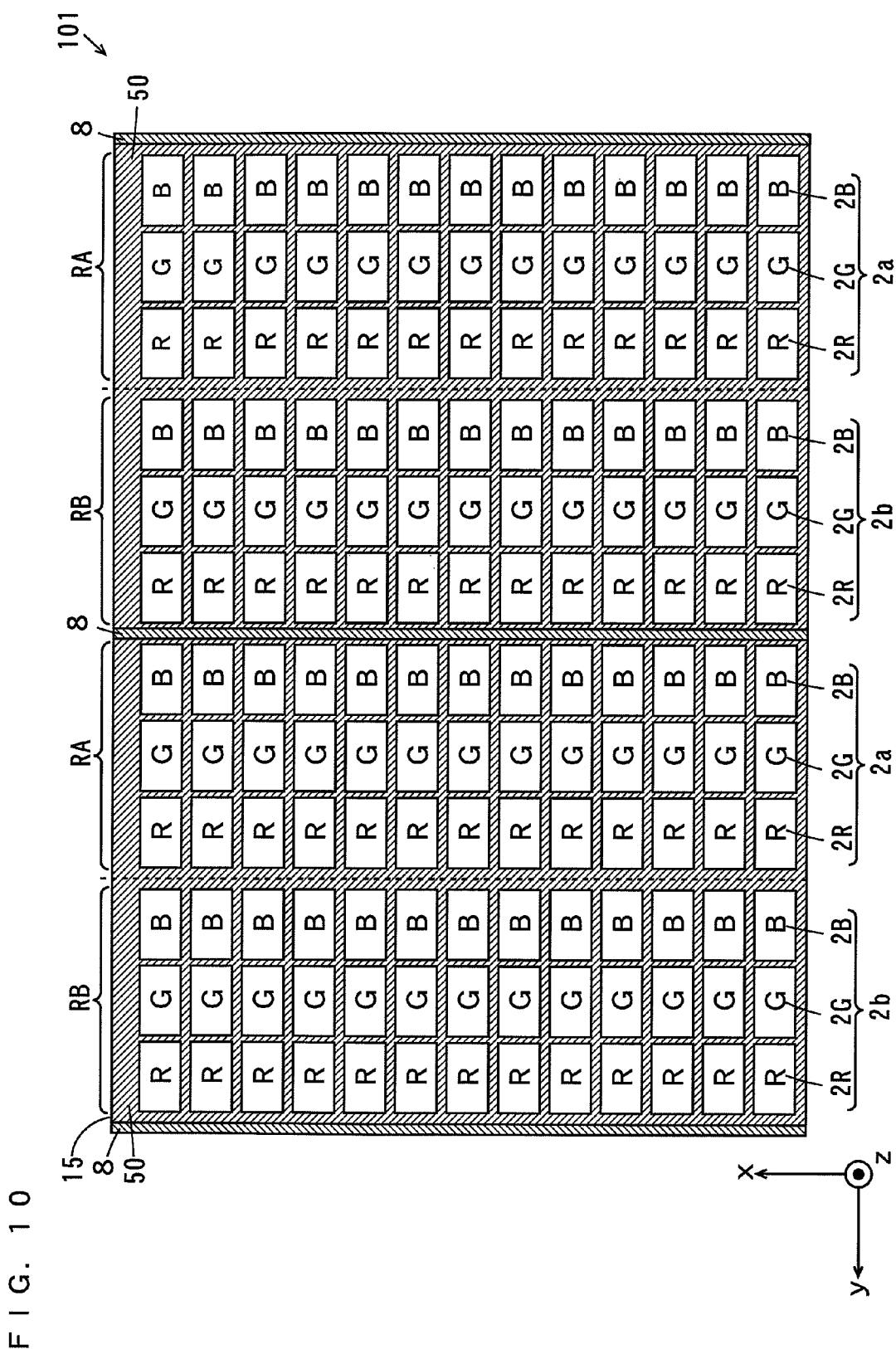
FIG. 10 is a schematic plan view of part of the plasma display device of FIG. 9.

FIG. 9 is a schematic sectional view of part of the plasma display device according to the third embodiment of the present invention. FIG. 10 is a schematic plan view of part of the plasma display device of FIG. 9.

The plasma display device 101 of FIG. 9 includes a plasma display panel (hereinafter referred to as a PDP) 15. The PDP 15 has a configuration in which a back surface glass substrate 11, a discharge cell group 12, a top surface glass substrate 13 and a front glass filter 14 are laminated in this order. Generally, a space exists between the top surface glass substrate 13 and the front glass filter 14.

The discharge cell group 12 includes a plurality of sub-pixels 2R, 2G, 2B arranged in the form of a matrix in the x-direction and the y-direction. The sub-pixel 2R is composed of a discharge cell generating red light, the sub-pixel 2G is composed of a discharge cell generating green light, and the sub-pixel 2B is composed of a discharge cell generating blue light.

As shown in FIG. 10, the sub-pixels 2R of the same kind, the sub-pixels 2G of the same kind or the sub-pixels 2B of the same kind are arranged in respective columns that are parallel to the x-direction. The three kinds of sub-pixels 2R, 2G, 2B are sequentially arranged in each row that is parallel to the y-direction.

The black matrix 50 is provided in a region surrounding each of the sub-pixels 2R, 2G, 2B of the discharge cell group 12. The black matrix 50 is composed of barrier ribs between discharge cells.

The PDP 15 is divided into the plurality of regions RA and the plurality of regions RB that extend in respective striped shapes along the x-direction. The plurality of regions RA and the plurality of regions RB are arranged so as to alternately align in the y-direction.

The plurality of sub-pixels 2R, 2G, 2B are assigned to the first group and the second group. The three sub-pixels 2R, 2G, 2B of the first group that align along the y-direction constitute a pixel 2a. The three sub-pixels 2R, 2G, 2B of the second group that align along the y-direction constitute a pixel 2b.

In the region RA, the plurality of pixels 2a of the first group align along the x-direction. Thus, the plurality of sub-pixels 2R, 2G, 2B align in respective three columns along the x-direction in the region RA. Similarly, the plurality of pixels 2b of the second group align along the x-direction in the region RB. Thus, the plurality of sub-pixels 2R, 2G, 2B align in respective three columns along the x-direction in the region RB.

Each pair of regions RA, RB being adjacent to each other constitutes each set. The parallax barriers 8 are formed in portions on the black matrix 50 between the adjacent sets and portions on the black matrix 50 on outer sides of the regions RA, RB positioned at ends, respectively.

In the example of FIG. 10, the parallax barriers 8 extending in the x-direction are formed in a portion on the black matrix 50 between the region RA of one set of the two adjacent sets and the region RB of the other set and portions on the black matrix 50 on outer sides of the regions RA, RB positioned at both ends, respectively.

Similarly to the first embodiment, resin, metal and so on can be used for a material of the parallax barriers 8. The color of the parallax barriers 8 is preferably black, which is the same color as the black matrix 50, and is matte black, for example.

As shown in FIG. 9, the parallax barriers 8 block light traveling obliquely forward to the left from the regions RA and block light traveling obliquely forward to the right from the regions RB. Accordingly, the viewer 110 positioned in the obliquely forward direction to the right of the plasma display device 101 can see the pixels 2a of the regions RA of the PDP 15 as indicated by the arrow A, and cannot see the pixels 2b of the regions RB because of the parallax barriers 8. On the other hand, the viewer 120 positioned in the obliquely forward direction to the left of the plasma display device 101 can see the pixels 2b of the regions RB of the PDP 15 as indicated by the arrow B, and cannot see the pixels 2a of the regions RA because of the parallax barriers 8. Accordingly, the viewer 110 can see video displayed by the pixels 2a of the regions RA of the PDP 15, and the viewer 120 can see video displayed by the pixels 2b of the regions RB of the PDP 15.

The angle from which the viewer 110 can see only the pixels 2a of the regions RA and the angle from which the viewer 120 can see only the pixels 2b of the regions RB vary depending on the height of the parallax barriers 8.

For example, when the height of the parallax barriers 8 is substantially equal to the width of the region RA or the region RB in the y-direction, the viewer 110 can see only the pixels 2a of the regions RA from the direction of 45° with respect to the front surface of the PDP 15, and the viewer 120 can see only the pixels 2b of the regions RB from the direction of 45° with respect to the front surface of the PDP 15.

Note that the configuration of the video signal processing circuit used in the plasma display device 101 according to the present embodiment is the same as the configuration shown in FIG. 4.

(3-2) Effects

In the plasma display device 101 according to the present embodiment, the parallax barriers 8 formed on the black matrix 50 of the PDP 15 allow the viewer 110 positioned in the obliquely forward direction to the right and the viewer 120 positioned in the obliquely forward direction to the left to see different kinds of video, respectively, in the common plasma display device 101.

In this case, it is not necessary to add structural elements such as an optical control element, a switchable half-wavelength plate and a linear polarizing plate between the back surface glass substrate 11 and the top surface glass substrate 13. This does not cause the configuration of the PDP 15 to be complicated, thus not preventing reduction in thickness. In addition, since the linear polarizing plate is not necessary, a lower luminance is prevented.

In addition, since the parallax barriers 8 are formed in the portions on the black matrix 50 surrounding each of the sub-pixels 2R, 2G, 2B, the parallax barriers 8 do not become an obstacle when the PDP 15 is seen from the front. This prevents a lower luminance of the PDP 15, resulting in high practicality. In addition, the PDP 15 is not increased in size for providing the parallax barriers 8.

Furthermore, the parallax barriers 8 can be easily manufactured at low cost using resin, metal and so on and can be easily formed on the black matrix 50 of the discharge cell group 12, thus preventing complicated manufacturing processes and enabling reduction in cost.

In addition, since the right video 301 and the left video 302 can be displayed on the PDP 15 as the controller 203 of FIG. 4 alternately selects the right-use video signal VR and the left-use video signal VL, the switching operation is not necessary in the PDP 15. This does not cause the configuration of the video signal processing circuit 200 to be complicated.

(4) Fourth Embodiment

In the present embodiment, description is made of a case where the present invention is applied to a plasma display device as an example of the self-light emitting display device.

Figure 11:
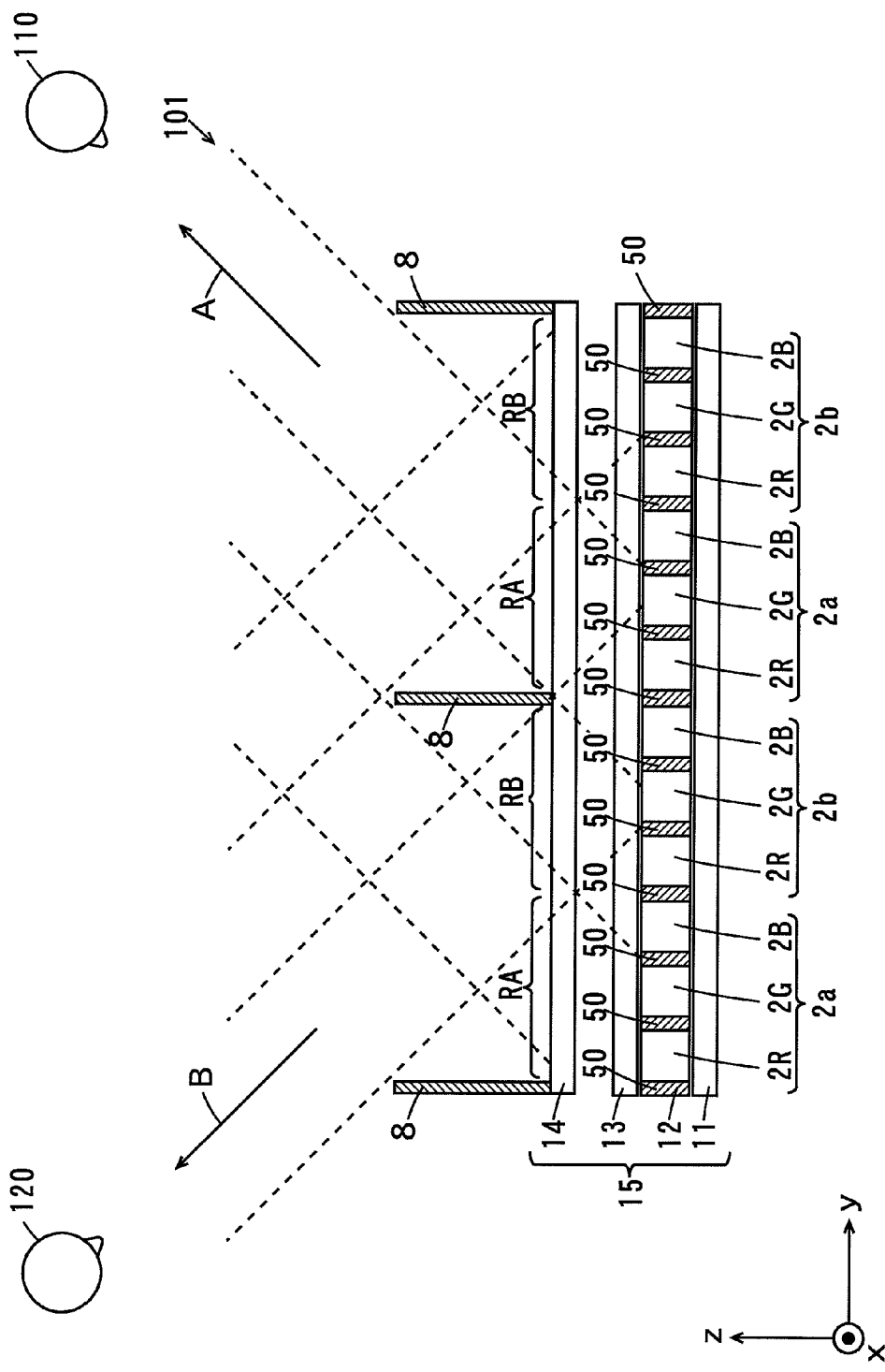
FIG. 11 is a schematic sectional view of part of a plasma display device provided with a top surface glass substrate, a front glass filter and a space therebetween being larger in thickness than those of the plasma display device of FIG. 9.

FIG. 11 is a schematic sectional view of part of the plasma display device provided with the top surface glass substrate 13, the front glass filter 14 and a space therebetween being larger in thickness than those of the plasma display device of FIG. 9.

As shown in FIG. 11, when the top surface glass substrate 13, the front glass filter 14 and the space therebetween are larger in thickness, a region (hereinafter referred to as a light transmission region) through which light can pass is formed between the parallax barriers 8 and the black matrix 50.

Therefore, light from the sub-pixels 2B of the regions RB travel obliquely forward to the right without being blocked by the parallax barriers 8. Thus, the viewer 110 positioned in the obliquely forward direction to the right of the plasma display device 101 can see the sub-pixels 2R, 2G of the regions RA and the sub-pixels 2B of the regions RB. In addition, light from the sub-pixels 2R of the regions RA travel obliquely forward to the left without being blocked by the parallax barriers 8. Thus, the viewer 120 positioned in the obliquely forward direction to the left of the plasma display device 101 can see the sub-pixels 2G, 2B of the regions RB and the sub-pixels 2R of the regions RA.

In this case, the viewer 110 and the viewer 120 see respective video in which part of video displayed by the regions RA and part of video displayed by the regions RB are mixed.

Therefore, the fourth embodiment provides a configuration that prevents the mix of part of video seen by the viewer 110 and part of video seen by the viewer 120.

Figure 12:
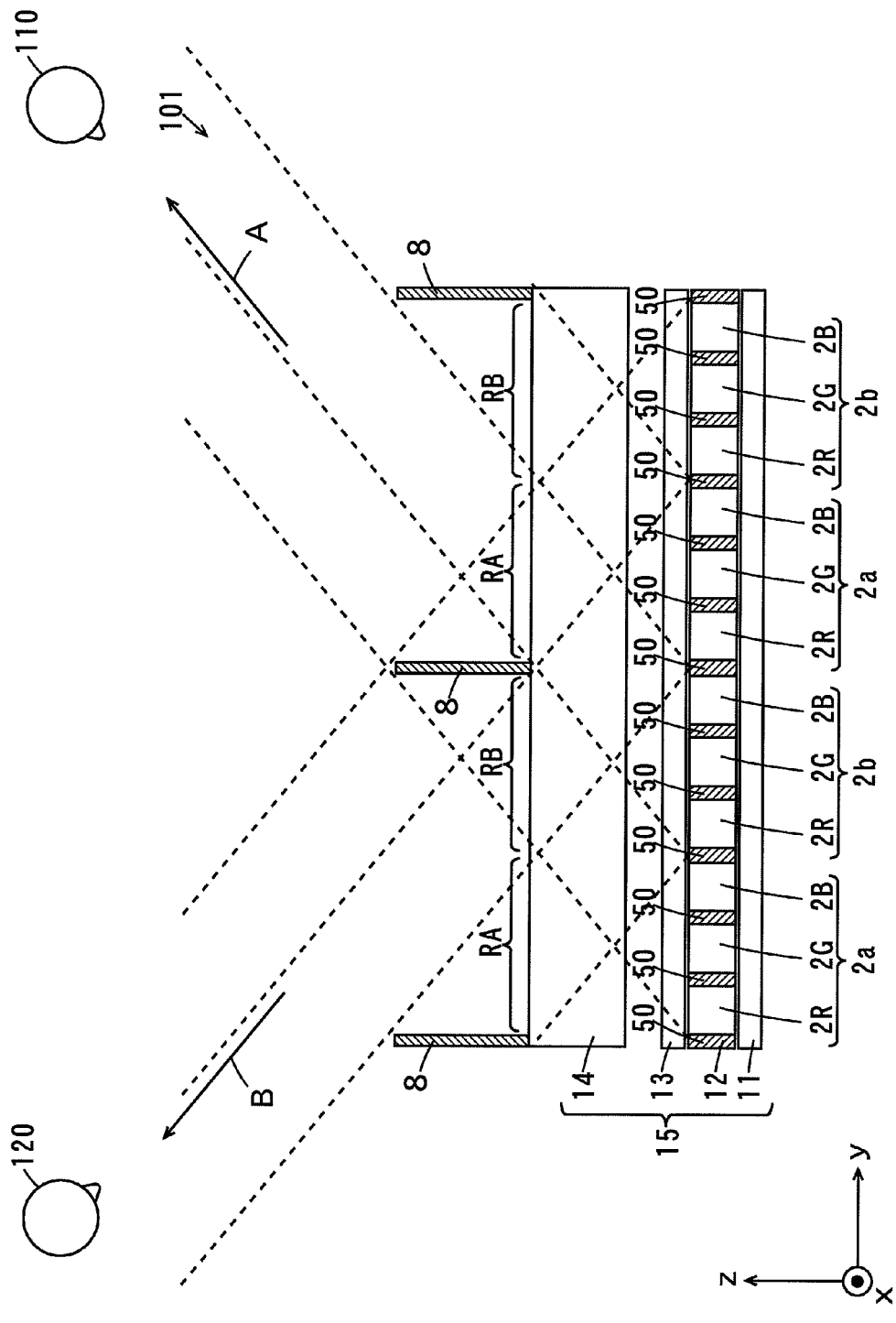
FIG. 12 is a schematic sectional view of part of a plasma display device according to a fourth embodiment of the present invention.

FIG. 12 is a schematic sectional view of part of the plasma display device according to the fourth embodiment of the present invention.

In the plasma display device 101 of FIG. 12, the thickness of the light transmission region between the parallax barriers 8 and the black matrix 50 is set as follows.

As shown in FIG. 12, light from the region RB can travel obliquely forward to the right through the light transmission region between the parallax barriers 8 and the black matrix 50, and light traveling obliquely forward to the right from the region RA is blocked by the parallax barriers 8. Moreover, light from the region RA can travel obliquely forward to the left through the light transmission region between the parallax barriers 8 and the black matrix 50, and light traveling obliquely forward to the left from the region RB is blocked by the parallax barriers 8.

Thus, the viewer 110 positioned in the obliquely forward direction to the right of the plasma display device 101 can see the pixels 2b of the regions RB of the PDP 15 through the light transmission region between the parallax barriers 8 and the black matrix 50 as indicated by the arrow A, and cannot see the pixels 2a of the regions RA because of the parallax barriers 8. On the other hand, the viewer 120 positioned in the obliquely forward direction to the left of the plasma display device 101 can see the pixels 2a of the regions RA of the PDP 15 through the light transmission region between the parallax barriers 8 and the black matrix 50 as indicated by the arrow B, and cannot see the pixels 2b of the regions RB because of the parallax barriers 8. Accordingly, the viewer 110 can see video displayed by the pixels 2b of the regions RB of the PDP 15, and the viewer 120 can see video displayed by the pixels 2a of the regions RA of the PDP 15.

While the thickness of the front glass filter 14 is larger than the thickness of the top surface glass substrate 13 and the thickness of the space therebetween in the present embodiment, a relationship between the thickness of the top surface glass substrate 13, the thickness of the front glass filter 14 and the thickness of the space therebetween is not limited to the example of FIG. 12. For example, the thickness of the top surface glass substrate 13 may be larger than the thickness of the front glass filter 14 and the thickness of the space therebetween. Alternatively, the thickness of the space between the top surface glass substrate 13 and the front glass filter 14 may be larger than the thickness of the top surface glass substrate 13 and the thickness of the front glass filter 14.

(5) Fifth Embodiment

In the present embodiment, description is made of a case where the present invention is applied to a plasma display device as an example of the self-light emitting display device.

Figure 13:
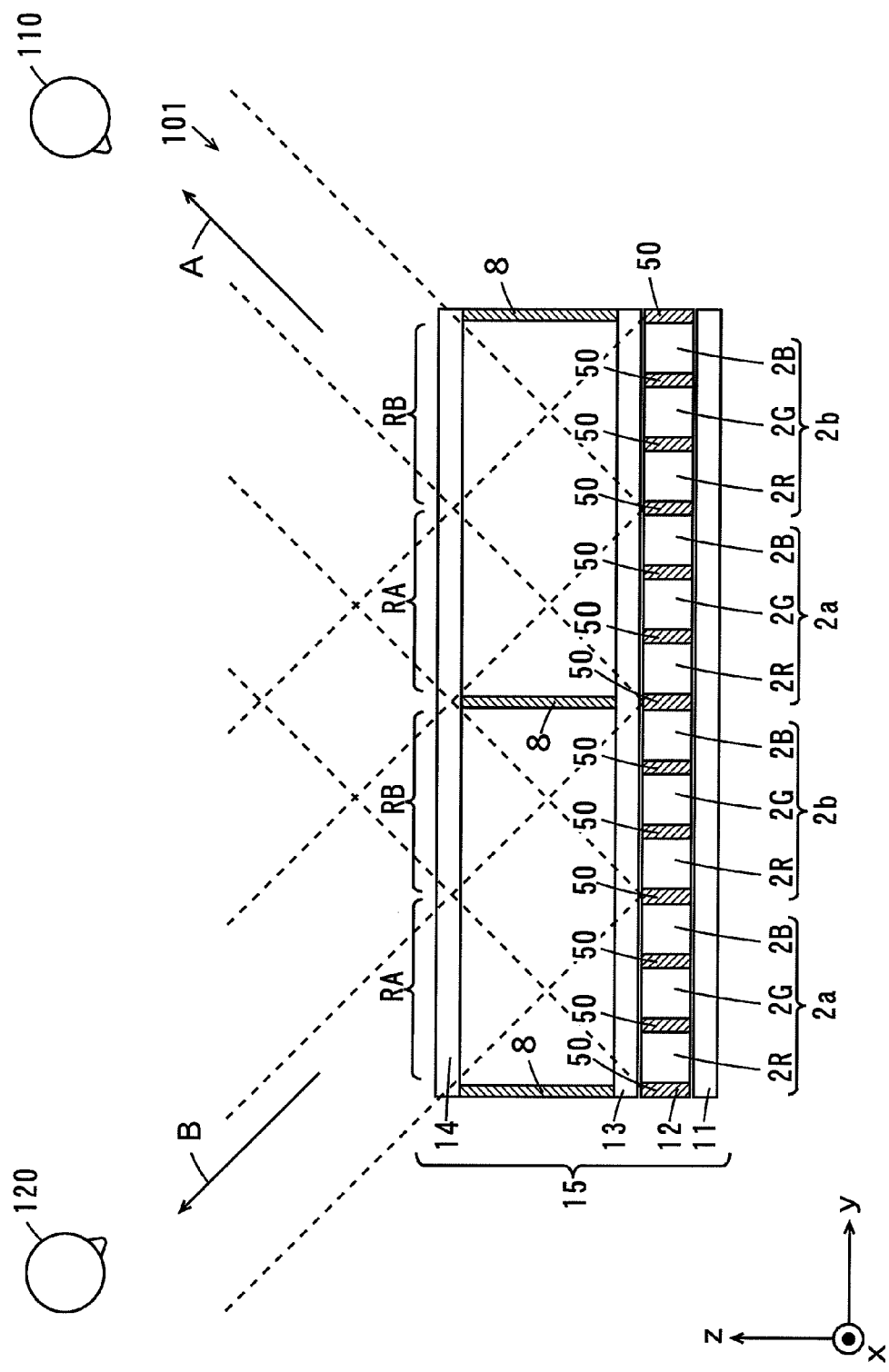
FIG. 13 is a schematic sectional view of part of a plasma display device according to a fifth embodiment of the present invention.

FIG. 13 is a schematic sectional view of part of the plasma display device according to the fifth embodiment of the present invention.

The plasma display device 101 of FIG. 13 is different from the plasma display device 101 of FIG. 9 in that the parallax barriers 8 are provided in the space between the top surface glass substrate 13 and the front glass filter 14.

Thus, the parallax barriers 8 are protected by the front glass filter 14. Moreover, the parallax barriers 8 are proximate to the black matrix 50, thus preventing part of the video displayed by the regions RA and part of the video displayed by the regions RB from being mixed with each other.

(6) Sixth Embodiment

In the present embodiment, description is made of a case where the present invention is applied to a plasma display device as an example of the self-light emitting display device.

Figure 14:
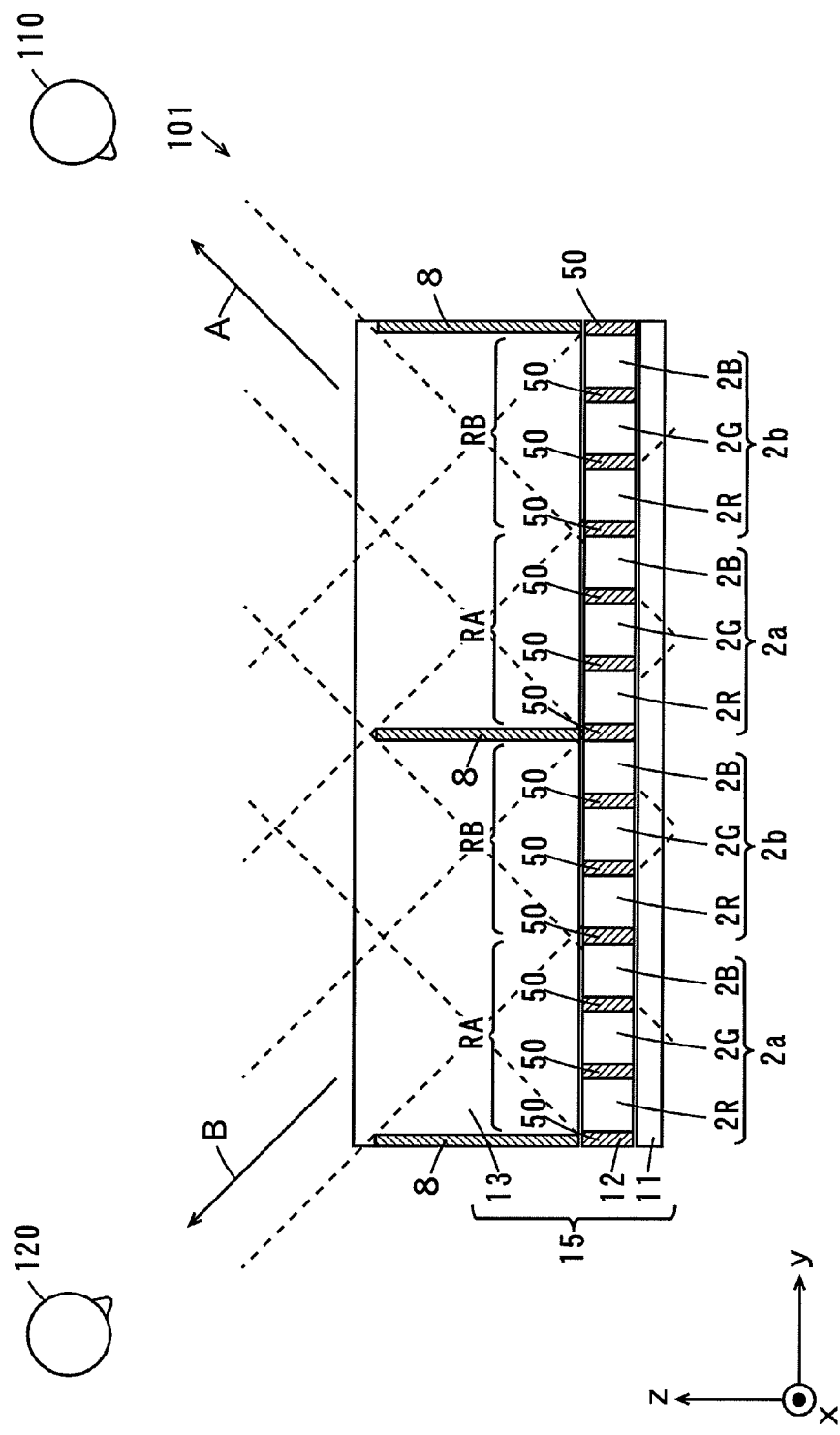
FIG. 14 is a schematic sectional view of part of a plasma display device according to a sixth embodiment of the present invention.
Figure 16:
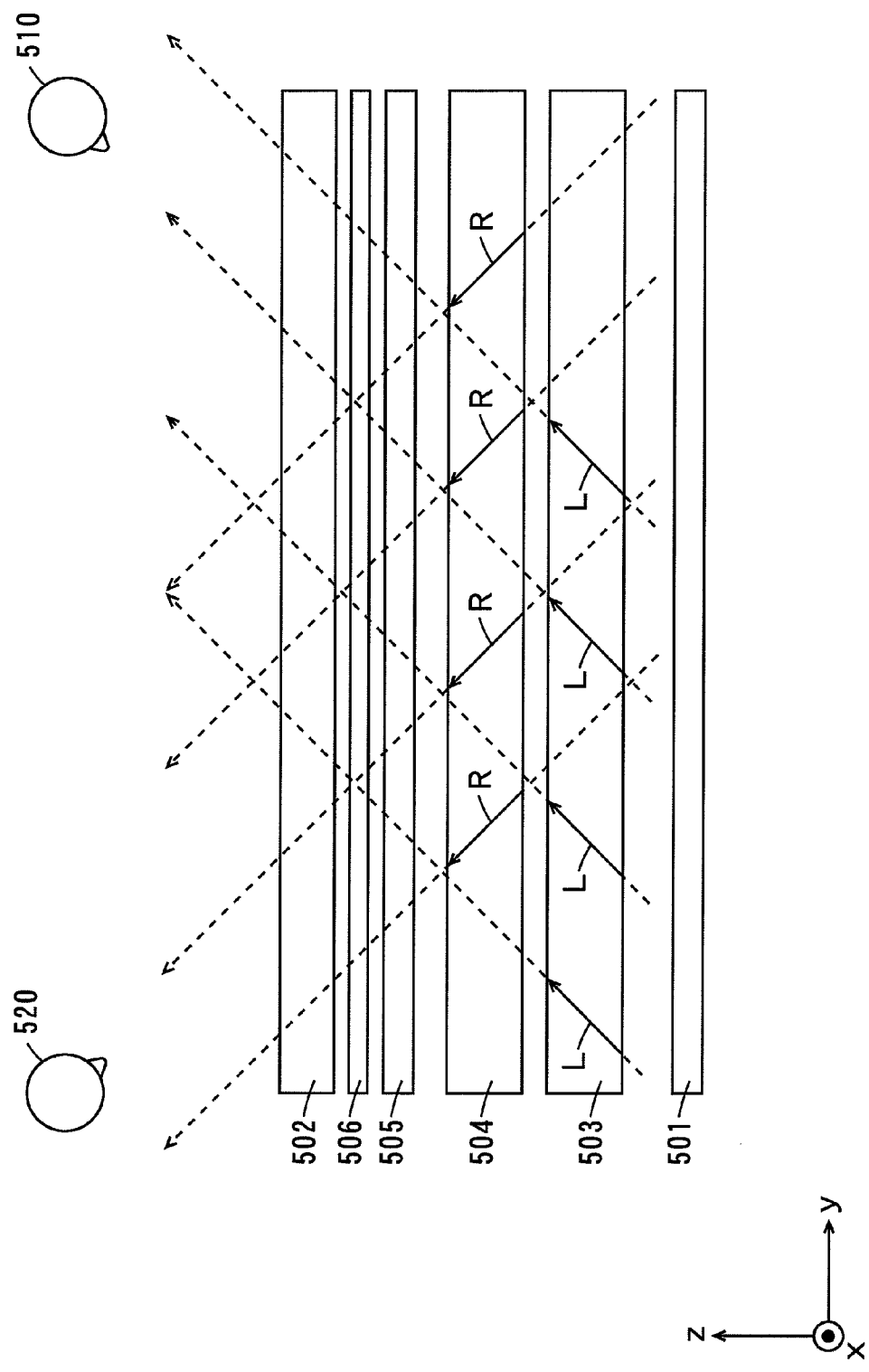
FIG. 16 is a schematic view showing the configuration of a conventional dual view display.

FIG. 14 is a schematic sectional view of part of the plasma display device according to the sixth embodiment of the present invention.

The plasma display device 101 of FIG. 14 is different from the plasma display device 101 of FIG. 9 in that the parallax barriers 8 are provided within the front glass filter 14 into which the top surface glass substrate is integrated.

Since the parallax barriers 8 are more proximate to the pixels 2a, 2b, the video displayed by the pixels 2a of the regions RA and the video displayed by the pixels 2b of the regions RB are separated from each other with high precision. In addition, the parallax barriers 8 are protected by the front glass filter 14.

(7) Other Embodiments (7-1)

Arrangement of the pixels and the sub-pixels in the display panel is not limited to the arrangements in the above-described embodiments. FIG. 15 is a schematic view showing another example of the arrangement of the pixels and the sub-pixels.

In the example of FIG. 15, the sub-pixels 5R, 5G, 5B are sequentially arranged in each row along the y-direction. The sub-pixels 5R, 5G, 5B on each row are positioned to be adjacent to respective portions sandwiched between sub-pixels 5R, 5G, 5B on an adjacent row.

The two sub-pixels 5R, 5G of each row and the one sub-pixel 5B of a row adjacent thereto constitute the one pixel 5a or the one pixel 5b, and the one sub-pixel 5B on each row and the two sub-pixels 5R, 5G on a row adjacent thereto constitute the one pixel 5a or the one pixel 5b. In this case, the parallax barriers 8 are provided to have a rectangular wave shape and to snake.

While description is made of the case where the pixels on one line constitute one group in the foregoing first or second embodiment, the present invention is not limited to this. The dual view can be realized using the configuration in which pixels on a plurality of lines constitute one group and the parallax barriers 8 are arranged for every two groups as shown in FIG. 15.

(7-2)

In the liquid crystal display device 100 according to the first and second embodiments, the parallax barriers 8 may be provided between the color filter 5 and the top surface glass 6. Moreover, the parallax barriers 8 may be provided between the top surface glass 6 and the polarizing plate 7.

Furthermore, the parallax barriers 8 may be provided within the top surface glass 6 in consideration of the strength of the top surface glass 6. This configuration causes the parallax barriers 8 to be more proximate to the pixels 5a, 5b, so that the video displayed by the pixels 5a of the regions RA and the video displayed by the pixels 5b of the regions RB are separated from each other with high precision. In addition, the parallax barriers 8 are protected by the top surface glass 6.

(7-3)

In the plasma display device 101 according to the third to sixth embodiments, the parallax barriers 8 may be provided in a lattice shape as shown in FIG. 3.

Moreover, in the plasma display device 101 according to the third to sixth embodiments, the regions RA and the regions RB may be divided in the manner shown in FIG. 7.

(7-4)

The present invention is not limited to the liquid crystal display device and the plasma display device. For example, the present invention can be applied to various types of dot-matrix type display devices having a black matrix.

(7-5)

The present invention can also be applied to various types of dot-matrix type display devices that perform monochrome display. In this case, each pixel corresponds to a unit of display.

(8) Correspondences between Elements in the Claims and Parts in Embodiments

In the following paragraphs, non-limiting examples of correspondences between various elements recited in the claims below and those described above with respect to various preferred embodiments of the present invention are explained.

In the above-described embodiments, the sub-pixels 5R, 5G, 5B or the sub-pixels 2R, 2G, 2B are examples of a unit of display, the liquid crystal display panel 10 or the PDP 15 are examples of a display panel, the parallax barriers 8 are examples of a barrier, the region RA is an example of a first region and the region RB is an example of a second region.

Left is an example of one side or another side, right is an example of another side or one side, the x-direction is an example of a first direction, the y-direction is an example of a second direction, the controller 203 is an example of a controller, the right-use video signal VR is an example of a first or second video signal, the left-use video signal VL is an example of the second or first video signal, and the front-use video signal VD is an example of a third video signal.

The polarizing plate 2 is an example of a first polarizing plate, the polarizing plate 7 is an example of a second polarizing plate, the color filter 5 is an example of a filter, and the sub-pixels 5R, 5G, 5B are examples of a filter portion.

The back surface glass substrate 11 is an example of a first substrate, the top surface glass substrate 13 is an example of a second substrate, the discharge cell group 12 is an example of a light emitting cell group, and the sub-pixels 2R, 2G, 2B are examples of a light emitting cell.

[Industrial Applicability]

The present invention is applicable to a dual view display device capable of presenting different kinds of video when seen from different angles.

The invention claimed is:

1. A display device, comprising:
   a display panel including a plurality of units of display arranged in the form of a matrix and including a black matrix in a region between the units of display; and
   a barrier configured so as to project directly forward from a front face of said display panel that is present directly in front of said black matrix, wherein
   said plurality of units of display are divided into a first group and a second group, and
   said barrier is configured so as to block light traveling obliquely forward to one side of said display panel from the units of display of said first group and block light traveling obliquely forward to another side of said display panel from the units of display of said second group, but not to block light traveling directly forward to the front face of said display panel from the units of display of said first group and the units of display of said second group,
   wherein the barrier is configured such that a first viewing person positioned to the one side of said display panel can only view a first video displayed on the first group of said plurality of units of display, and that a second viewing person positioned to the another side of said display panel can only view a second video displayed on the second group of said plurality of units of display.

2. The display device according to claim 1, wherein
   said display panel is divided into a plurality of first regions and a plurality of second regions in respective striped shapes extending in a first direction, said plurality of first regions and said plurality of second regions are alternately arranged in a second direction that crosses said first direction,
   the units of display of said first group are arranged in said plurality of first regions, the units of display of said second group are arranged in said plurality of second regions, and
   pairs of the first and second regions that are adjacent to each other constitute respective sets, and said barrier is formed in a striped shape in portions on the black matrix between the adjacent sets.

3. The display device according to claim 2, wherein
   said plurality of units of display include a plurality of first sub-pixels that generate light of a first color, a plurality of second sub-pixels that generate light of a second color and a plurality of third sub-pixels that generate light of a third color, and one of the first sub-pixels, one of the second sub-pixels and one of the third sub-pixels constitute one pixel,
   a plurality of pixels are divided into said first group and said second group, the first, second and third sub-pixels that constitute each of the pixels of said first group are arranged in the same first region, and the first, second and third sub-pixels that constitute each of the pixels of said second group are arranged in the same second region.

4. The display device according to claim 3, wherein
   the plurality of pixels of said first group included in each of said plurality of first regions are arranged in a column, and the plurality of pixels of said second group included in each of said plurality of second regions are arranged in a column.

5. The display device according to claim 2, wherein
   said plurality of units of display include a plurality of first sub-pixels that generate light of a first color, a plurality of second sub-pixels that generate light of a second color and a plurality of third sub-pixels that generate light of a third color, and one of the first sub-pixels, one of the second sub-pixels and one of the third sub-pixels constitute one pixel, and
   a plurality of pixels are divided into said first group and said second group, the first sub-pixel, the second sub-pixel and the third sub-pixel that constitute each of the pixels of said first group are arranged in the different first regions, respectively, and the first sub-pixel, the second sub-pixel and the third sub-pixel that constitute each of the pixels of said second group are arranged in the different second regions, respectively.

6. The display device according to claim 5, wherein the plurality of first sub-pixels, the plurality of second sub-pixels or the plurality of third sub-pixels of said first group included in each of said plurality of first regions are arranged in a column, and the plurality of first sub-pixels, the plurality of second sub-pixels or the plurality of third sub-pixels of said second group included in each of said plurality of second regions are arranged in a column.

7. The display device according to claim 1, wherein
   said plurality of units of display are composed of a plurality of filter portions that transmit light of respective specific colors, and
   said display panel includes
   a backlight that generates light,
   a first polarizing plate,
   a liquid crystal cell,
   a filter including said plurality of filter portions and said black matrix, and
   a second polarizing plate in this order.

8. The display device according to claim 1, wherein
   said plurality of units of display are composed of a plurality of light emitting cells that generate light of respective specific colors, and
   said display panel includes
   a first substrate,
   a light emitting cell group including said plurality of light emitting cells and said black matrix, and
   a second substrate that is translucent in this order.

9. The display device according to claim 1, further comprising a controller that receives a first video signal corresponding to said first group and a second video signal corresponding to said second group, causes first video to be displayed by the units of display of said first group of said display panel based on said first video signal, and causes second video to be displayed by the units of display of said second group of said display panel based on said second video signal.

10. The display device according to claim 9, wherein said controller receives a third video signal for a front view of said display panel and causes video to be displayed by the units of display of said first and second groups of said display panel based on said third video signal.

11. A display device,. comprising:
a display panel including a plurality of units of display arranged in the form of a matrix and including a black matrix in a region between the units of display; and
a barrier configured so as to project directly forward from a front face of said display panel that is present directly in from of said black matrix, wherein
said plurality of units of display are divided into a first group viewable by a first viewing person and a second group viewable by a second viewing person, and
said barrier is configured so as to block light traveling obliquely forward to one side of said display panel from the units of display of said first group viewable by said first viewing person and block light traveling obliquely forward to another side of said display panel from the units of display of said second group viewable by second viewing person, but not to block light traveling directly forward to the front face of said display panel form the units of display of said first group and the units of display of said second group,
wherein the units of display of said first group viewable by said first viewing person are configured to be able to display a first video, and the units of display of said second group viewable by said second viewing person are configured to be able to display a second video that is different from said first video.

12. A display device, comprising:
a display panel including a plurality of units of display arranged in the form of a matrix and including a black matrix in a region between the units of display;
a barrier formed on the black matrix of said display panel,
wherein said plurality of units of display are divided into a first group and a second group, and said barrier is provided so as to block light traveling obliquely forward to one side of said display panel from the units of display of said first group and block light traveling obliquely forward to another side of said display panel from the units of display of said second group, and
wherein the barrier is configured such that a first viewer positioned to the one side of said display panel can only view a first video displayed on the first group of said plurality of units of display, and that a second viewer positioned to the another side of said display panel can only view a second video displayed on the second group of said plurality of units of display; and
a controller that receives a first video signal corresponding to said first group and a second video signal corresponding to said second group, causes first video to be displayed by the units of display of said first group of said display panel based on said first video signal, and causes second video to be displayed by the units of display of said second group of said display panel based on said second video signal,
wherein said controller receives a third video signal for a front view of said display panel and causes video to be displayed by the units of display of said first and second groups of said display panel based on said third video signal.

* * * * *